(12) United States Patent
Wang et al.

(10) Patent No.: US 11,489,765 B2
(45) Date of Patent: Nov. 1, 2022

(54) DATA PROCESSING METHOD AND DEVICE, AND COMPUTER READABLE STORAGE MEDIUM

(71) Applicant: ZTE Corporation, Shenzhen (CN)

(72) Inventors: Yansong Wang, Shenzhen (CN);
 Fangwei Hu, Shenzhen (CN);
 Guangping Huang, Shenzhen (CN);
 Zhuo Li, Shenzhen (CN); Kaihua Liu, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 44 days.

(21) Appl. No.: 17/048,809

(22) PCT Filed: Apr. 3, 2019

(86) PCT No.: PCT/CN2019/081204
§ 371 (c)(1),
(2) Date: Oct. 19, 2020

(87) PCT Pub. No.: WO2019/201091
PCT Pub. Date: Oct. 24, 2019

(65) Prior Publication Data
US 2021/0168069 A1    Jun. 3, 2021

(30) Foreign Application Priority Data
Apr. 19, 2018 (CN) .................. 201810356463.X

(51) Int. Cl.
 *H04L 12/725* (2013.01)
 *H04L 45/302* (2022.01)
 (Continued)

(52) U.S. Cl.
 CPC ........ *H04L 45/306* (2013.01); *G06F 16/9032* (2019.01); *H04L 45/74* (2013.01); *H04L 67/568* (2022.05); *H04L 67/63* (2022.05)

(58) Field of Classification Search
 CPC ... G06F 16/9032; H04L 45/306; H04L 45/74; H04L 67/2842; H04L 67/327
 See application file for complete search history.

(56) References Cited

U.S. PATENT DOCUMENTS

2011/0280214 A1* 11/2011 Lee .................. H04L 67/327
                                                 370/331
2016/0105524 A1*  4/2016 Farhadi ............... H04L 49/90
                                                 370/412

FOREIGN PATENT DOCUMENTS

CN    105072030 A    11/2015
CN    105704032 A     6/2016
(Continued)

OTHER PUBLICATIONS

Notification of Reason for Refusal for Korean Application No. 10-2020-7030227 dated Nov. 18, 2021, 9 pages (with english translation).
(Continued)

*Primary Examiner* — Mansour Oveissi
(74) *Attorney, Agent, or Firm* — Eversheds Sutherland (US) LLP

(57) ABSTRACT

A data processing method and device, and a computer readable storage medium, the data processing method, applied to a node in an Information-Centric Network (ICN), includes: acquiring a first offset address corresponding to a first ICN packet; querying a record pointed to by the first offset address and performing data processing according to a query result; the record pointed to by the first offset address is used to store a storage address of a second ICN packet or forwarding information of the second ICN packet in response to the second ICN packet corresponding to the first ICN packet being stored locally.

22 Claims, 10 Drawing Sheets

(51) Int. Cl.
*G06F 16/9032* (2019.01)
*H04L 45/74* (2022.01)
*H04L 67/63* (2022.01)
*H04L 67/568* (2022.01)

(56) References Cited

FOREIGN PATENT DOCUMENTS

| | | |
|---|---|---|
| CN | 106506719 A | 3/2017 |
| CN | 107908357 A | 4/2018 |
| EP | 2562978 A1 | 2/2013 |
| WO | 2017165246 A1 | 9/2017 |

OTHER PUBLICATIONS

Li et al., "Hybrid wireless networks with FIB-based Named Data Networking", Eurasip Journal on Wireless Communications and Networking, Biomed Central Ltd, , vol. 2017, No. I, Mar. 21, 2017, pp. 1-7, XP021243245, DOI: 10.1186/S13638-017-0836-0, London, UK.

Supplemental European Search Report for EP Application No. 19788847.2, dated Dec. 18, 2020, 13 pages.

English Translation of the International Search Report and Written Opinion for PCT Application No. PCT/CN2019/081204, dated Jul. 1, 2019 (4 pages).

* cited by examiner

DATA PROCESSING METHOD AND DEVICE, AND COMPUTER READABLE STORAGE MEDIUM

This application claims priority to Chinese patent application No. CN201810356463.X, filed Apr. 19, 2018 and entitled "data processing method and device, and computer readable storage medium", the content of which is incorporated herein by reference in its entirety.

TECHNICAL FIELD

The present invention relates to the field of communication technology, in particular to a data processing method and device, and a computer readable storage medium.

BACKGROUND

Information-Centric Networking (ICN) is a brand-new Internet communication architecture. As a new Internet communication model with data content as the core and user demand as the guide, ICN has completely broken the limitation of the existing network architecture based on TCP/IP technology. This Internet communication architecture establishes a communication model on the basis of identification data, and fundamentally changes the encapsulation structure and addressing mode of IP packets by adopting the communication mode driven by content requester, which is beneficial to the cross-regional handover of mobile communication devices, thus reducing communication delay, and solving the problems such as inability to cope with high-speed mobile communications, exhaustion of IP address space, low network transmission efficiency, and poor security, etc., under the traditional Internet architecture.

A forwarding plane of ICN processes many kinds of data, including an Interest packet and a Data packet. The forwarding plane of ICN needs to retrieve whether there is a Data packet requested by an Interest packet, or whether there is an Interest packet requesting a Data packet.

Currently, the query efficiency of ICN packets in the ICN network is low.

SUMMARY

In order to address the above technical problems, according to some embodiments of the present invention, a data processing method and device, and a computer readable storage medium are expected to be provided, to address the problem of low query efficiency of ICN packets in the ICN network in the existing technology.

To achieve the above purpose, the technical schemes of the embodiments of the present invention are performed as follows.

In a first aspect, the present invention provides a data processing method, applied to a node in an Information-Centric Network (ICN), including: and acquiring a first offset address corresponding to a first ICN packet; querying a record pointed to by the first offset address and performing data processing according to a query result; where the record pointed to by the first offset address is used to store a storage address of a second ICN packet or forwarding information of the second ICN packet in response to the second ICN packet corresponding to the first ICN packet being stored locally.

In a second aspect, the present invention provides a data processing method, applied to a node in an Information-Centric Network (ICN), including: acquiring a first ICN packet, the first ICN packet is an Interest packet or a Data packet; determining a position of a flag bit corresponding to the first ICN packet in an index unit according to a positioning function; and querying or setting a value of the flag bit corresponding to the first ICN packet according to the position of the flag bit corresponding to the first ICN packet; the value of the flag bit in the index unit is used to indicate whether an Interest packet and/or a Data packet corresponding to the flag bit are stored locally.

In a third aspect, the present invention provides a data processing device, applied to an Information-Centric Network (ICN), the device includes a processor and a memory for storing a computer program executable in the processor; the processor is configured to, in response to performing the computer program, executes the steps of the data processing method of any in the first aspect, and/or executes the steps of the data processing method of any in the second aspect.

In a fourth aspect, the present invention provides a computer readable storage medium storing a message forwarding program, which, when executed by a processor, performs the steps of the data processing method of any in the first aspect, and/or the steps of the data processing method of any in the second aspect.

In the embodiments of the present invention, the data processing method provided by the embodiments of the present invention can improve the query efficiency of the ICN packet in the ICN network by: acquiring a first offset address corresponding to a first ICN packet; querying a record pointed to by the first offset address and performing data processing according to a query result; the record pointed to by the first offset address is used to store a storage address of a second ICN packet or forwarding information of the second ICN packet when the second ICN packet corresponding to the first ICN packet is stored locally.

DETAILED DESCRIPTION

The technical schemes in the embodiments of the present invention will be described clearly and completely in conjunction with the drawings.

The technical schemes provided by the embodiments of the present invention may be applied to the structural design field of a router located in a forwarding plane in ICN. Before introducing the data processing method provided by some embodiments of the present invention, the application scenarios of the data processing method provided by some embodiments of the present invention are generally described.

To fundamentally address the inherent shortcomings of the network communication model based on TCP/IP technology, three data structures may be deployed on the forwarding plane of the Information-Centric Network (ICN): a Content Store (CS), a Pending Interest Table (PIT) and a Forwarding Information Base (FIB), where the PIT is used to store forwarding information of an Interest packet, and the forwarding information may include, for example, an identification of a Data packet requested by the Interest packet, information of a requester node requesting the Data packet, and the like; the CS is used to store the Data packet. The ICN uses these three data structures to realize content sharing and intelligent forwarding, thereby reducing network load and improving data transmission rate in the ICN network.

Figure 1A:
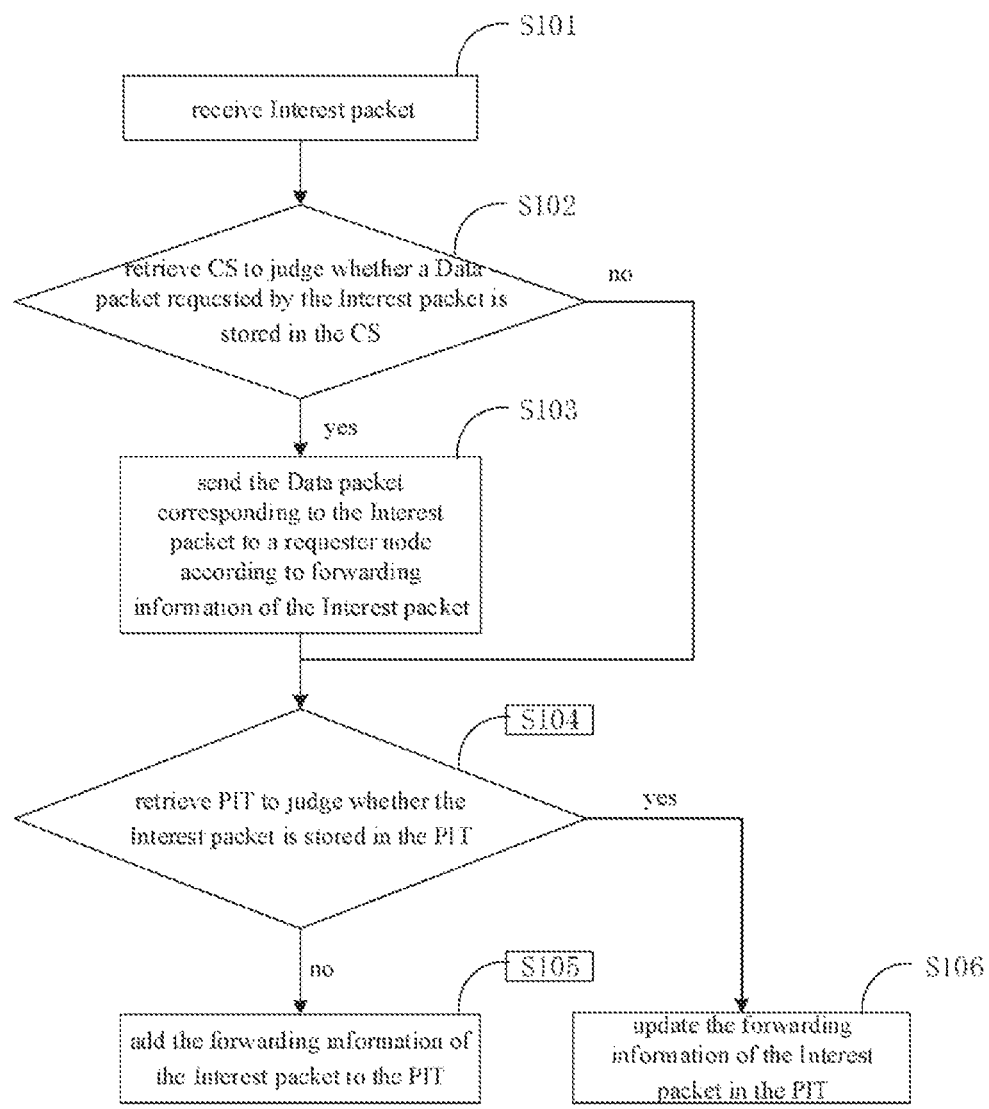
FIG. 1A is a schematic diagram of a working mechanism of an ICN forwarding plane when receiving an Interest packet.
Figure 1B:
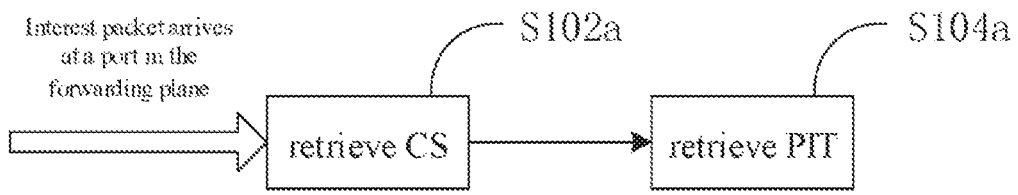
FIG. 1B is a schematic diagram of a retrieval sequence of an ICN forwarding plane when receiving an Interest packet.
Figure 2A:
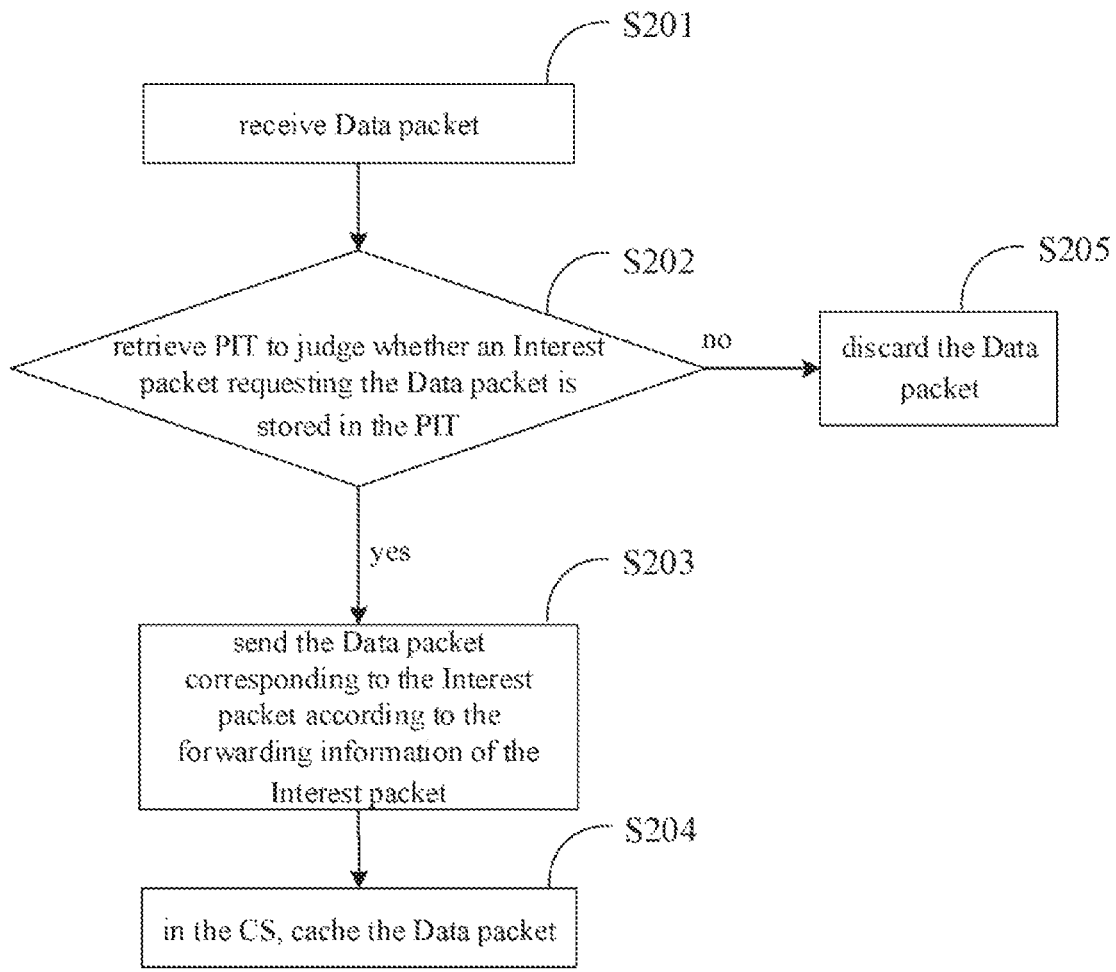
FIG. 2A is a schematic diagram of a working mechanism of an ICN forwarding plane when receiving a Data packet.
Figure 2B:
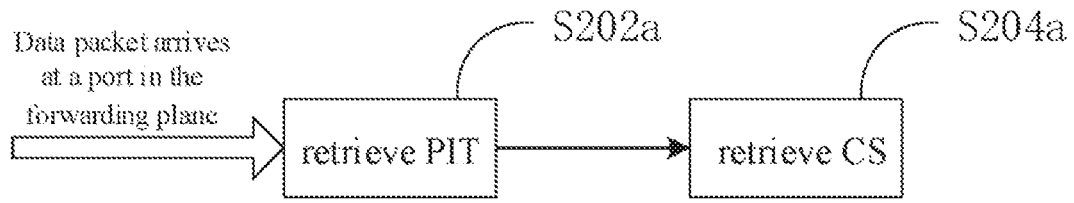
FIG. 2B is a schematic diagram of a retrieval sequence of an ICN forwarding plane when receiving a Data packet.

The working mechanism of the forwarding plane involving CS and the working mechanism of the forwarding plane involving PIT are very similar. FIG. 1A is a schematic diagram of a working mechanism of an ICN forwarding plane when receiving an Interest packet; FIG. 1B is a schematic diagram of a retrieval sequence of an ICN forwarding plane when receiving the Interest packet; FIG. 2A is a schematic diagram of the working mechanism of the ICN forwarding plane when receiving a Data packet; FIG. 2B is a schematic diagram of the retrieval sequence of the ICN forwarding plane when receiving the Data packet.

As shown in FIG. 1A, after an Interest packet arrives at a port of a forwarding plane, processing steps of the forwarding plane may include:

At S101, the Interest packet is received.

At S102, a CS is retrieved to judge whether a Data packet requested by the Interest packet is stored in the CS; and if the judgment result is "yes", S103 is executed, and if the judgment result is no, S104 is executed.

At S103, the Data packet corresponding to the Interest packet is sent to a requester node according to forwarding information of the Interest packet.

At S104, a PIT is retrieved to judge whether the Interest packet is stored in the PIT.

At S105, the forwarding information of the Interest packet is added to the PIT.

At S106, the forwarding information of the Interest packet in PIT is updated.

As shown in FIG. 1B, in the working mechanism of the forwarding plane involving CS and PIT, after the Interest packet arrives at a certain port of the forwarding plane, the forwarding plane will first retrieve the CS (see S102a), and then retrieve the PIT (see S104a).

As shown in FIG. 2A, after a Data packet arrives at a port of a forwarding plane, the processing steps of the forwarding plane may include:

At S201, the Data packet is received.

At S202, a PIT is retrieved to judge whether an Interest packet requesting the Data packet is stored in the PIT; and if the judgment result is "yes", S203 is executed, and if the judgment result is no, S205 is executed.

At S203, the Data packet is sent to a requester node according to forwarding information of the Interest packet.

At S204, the Data packet is cached in the CS.

At S205, the Data packet is discarded.

As shown in FIG. 1B, in the working mechanism of the forwarding plane involving CS and PIT, after the Data packet arrives at the forwarding plane, the forwarding plane first retrieves the PIT, and then caches the Data packet in the CS.

This repeated retrieval process ensures the accuracy of the retrieval, but will also affect the working performance of the forwarding plane. Therefore, the technical schemes provided by the embodiments of the present invention can address the problem that the forwarding plane of the ICN needs to retrieve data repeatedly from a plurality of table items in the working process.

The data processing method provided by some embodiments of the present invention is described in detail below. In the embodiments of the present invention, both the Interest packet and Data packet may be referred to as an ICN packet, and the technical schemes provided by the embodiments of the present invention may be applied to a scene where a node performs a corresponding Data processing after receiving any ICN packet, i.e., the Interest packet or the data packet.

Embodiment One

Figure 3:
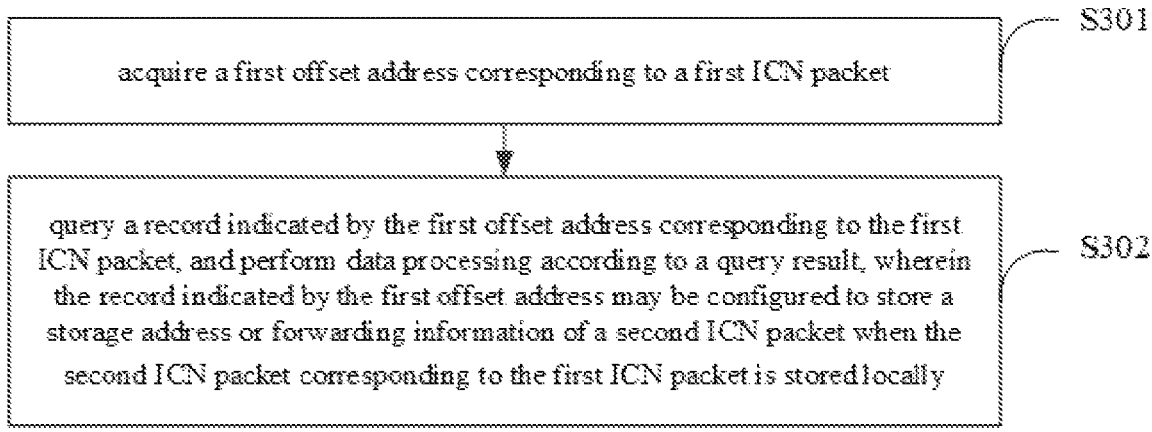
FIG. 3 is a flowchart I of a data processing method according to an embodiment of the present invention.

According to some embodiments of the present invention, a data processing method is provided, and an executive subject of the embodiments of the invention may be a node in an ICN. As an example, the node may be a router. The embodiments of the invention may be applied to a scene where the node acquires related information of a second ICN packet corresponding to a first ICN packet after the node receives the first ICN packet. FIG. 3 is a flowchart I of a data processing method according to some embodiments of the present invention. As shown in FIG. 3, the steps of an embodiment of the present invention may include: At step S301, a first offset address corresponding to a first ICN packet is acquired. At step S302, a record pointed to by the first offset address corresponding to the first ICN packet is queried, and data processing is performed according to a query result, the record pointed to by the first offset address may be used to store a storage address or forwarding information of a second ICN packet when the second ICN packet corresponding to the first ICN packet is stored locally.

In an embodiment of the present invention, the first offset address corresponding to the first ICN packet is acquired first, and then the record pointed to by the first offset address is queried and the data processing is performed according to the query result, the record pointed to by the first offset address may be used to store the storage address or the forwarding information of the second ICN packet when the second ICN packet corresponding to the first ICN packet is stored locally. It can thus be seen that there is a mapping relationship between the offset address and the ICN packet, and the record pointed to by the offset address is the forwarding information or the storage address. In this way, when the first ICN packet is an Interest packet or a Data packet, and the second ICN packet is a Data packet or an Interest packet, it only needs to find the first offset address according to the first ICN packet to avoid the problem caused by repeated retrieval of nodes in the ICN when receiving the Interest packet or the Data packet, thereby improving the retrieval efficiency of nodes.

In an embodiment of the present invention, before acquiring the offset address corresponding to the first ICN packet, a step of receiving the first ICN packet may be included. In an embodiment of the present invention, the first ICN packet may be an Interest packet or a Data packet. If the first ICN packet is an Interest packet, the second ICN packet corresponding to the first ICN packet may be a Data packet requested by the first ICN packet. If the first ICN packet is a Data packet, the second ICN packet corresponding to the first ICN packet may be an Interest packet requesting the first ICN packet.

In an embodiment of the present invention, querying the record pointed to by the first offset address and performing the data processing according to the query result may include: querying whether the record pointed to by the first offset address stores the storage address of the second ICN packet if the first ICN packet is an Interest packet, the second ICN packet is the Data packet requested by the first ICN packet; reading the second ICN packet from a storage space pointed to by the storage address of the second ICN packet if the record pointed to by the first offset address stores the storage address of the second ICN packet, and returning the second ICN packet according to forwarding information of the first ICN packet; and/or, querying whether the record pointed to by the first offset address stores the forwarding information of the second ICN packet if the first ICN packet is a Data packet, the second ICN packet is the Interest packet requesting the first ICN packet; returning the first ICN packet according to the forwarding information of the second ICN packet if the record pointed to by the first offset address stores the forwarding information of the second ICN packet.

In an embodiment of the present invention, acquiring the first offset address corresponding to the first ICN packet may be realized by the following embodiment. In an embodiment of acquiring the first offset address, if the first ICN packet is an Interest packet, acquiring the first offset address corresponding to the first ICN packet may include: acquiring an identification of the Data packet requested by the first ICN packet; and acquiring the first offset address according to the identification of the Data packet requested by the first ICN packet. In another embodiment of acquiring the first offset address, if the first ICN packet is a Data packet, acquiring the first offset address corresponding to the first ICN packet may include: acquiring an identification of the first ICN packet; and acquiring the first offset address according to the identification of the first ICN packet. In other embodiments of the present invention, the above two embodiments for acquiring the first offset address may also be used in combination. It should be noted that the forwarding information of the Interest packet may contain the identification of the requested Data packet, and the identification of the Data packet may be a name of the Data packet. As an example, the name of the Data packet may be "/ndn/UA/maps", etc.

In an embodiment of the present invention, the record pointed to by the first offset address may be a record in a record table, for example, the first offset address may be an address identification of the storage space of each record in the record table. After receiving the first ICN packet by the node, the related information of the second ICN packet corresponding to the first ICN packet may be obtained by acquiring the first offset address corresponding to the first ICN packet and querying the records in the record table according to the first offset address, thereby improving the retrieval efficiency of the node.

In an example of an embodiment of the record table, if the first ICN packet is an Interest packet and the second ICN packet is a Data packet requested by the Interest packet, the record pointed to by the first offset address corresponding to the first ICN packet may be used to store the storage address of the second ICN packet when the second ICN packet is stored locally. For example, the first offset address corresponding to Interest 1 may be offset address 11, the first offset address corresponding to Interest 2 may be offset address 12, the first offset address corresponding to Interest 3 may be offset address 13, the Data packet requested by Interest 1 is Data 1, the Data packet requested by Interest 2 is Data 2, and the Data packet requested by Interest 3 is Data 3. Table 1 is example one of the record table.

TABLE 1

| offset address | storage address of Data packet requested by Interest packet in CS |
|---|---|
| offset address 11 | storage address of Data 1 |
| offset address 12 | storage address of Data 2 |
| offset address 13 | — |

Where, the record pointed to by offset address 11 may store the storage address of Data 1, and the record pointed to by offset address 12 may store the storage address of Data 2. Since this node does not currently store Data 3 corresponding to Interest 3, the record pointed to by offset address 13 may not currently store the storage address of Data 3. In other embodiments of the present invention, when this node receives Data 3 and caches Data 3 in CS, the storage address of Data 3 in CS may be stored in the record pointed to by offset address 13 in the record table. With this embodiment, the problems caused by repeated retrieval can be avoided when the Interest packet is received, and the retrieval efficiency of the node can be improved.

In another example of an embodiment of the record table, if the first ICN packet is a Data packet and the second ICN packet is an Interest packet requesting the first ICN packet, the record pointed to by the first offset address may be used to store the forwarding information of the second ICN packet when the second ICN packet is stored locally. For example, the first offset address corresponding to Data 1 may be offset address 21, the first offset address corresponding to Data 2 may be offset address 22, the first offset address corresponding to Data 3 may be offset address 23, the Interest packet requesting Data 1 is Interest 1, the Interest packet requesting Data 2 is Interest 2 and the Interest packet requesting Data 3 is Interest 3. Table 2 is example two of the record Table.

TABLE 2

| offset address | forwarding information of Interest packet |
|---|---|
| offset address 21 | forwarding information of Interest 1 |
| offset address 22 | forwarding information of Interest 2 |
| offset address 23 | — |

Where, the record pointed to by offset address 21 stores the forwarding information of Interest 1, and the record pointed to by offset address 22 stores the forwarding information of Interest 2. Since the record pointed to by offset address 23 does not store the forwarding information of Interest 3, it may indicate that the node has not received Interest 3 at present. In other embodiments of the present invention, when this node receives Interest 3, the forwarding information of Interest 3 may be stored in the record pointed to by the offset address 13 in the record table. With this embodiment, the problems caused by repeated retrieval can be avoided when the Data packets are received, and the retrieval efficiency of the node can be improved.

In other embodiments of the present invention, the first offset address corresponding to the first ICN packet may be the same as the second offset address corresponding to the second ICN packet. When the first offset address corresponding to the first ICN packet is the same as the second offset address corresponding to the second ICN packet, the record pointed to by the first offset address corresponding to the first ICN packet may actually be used to store the storage address of the first ICN packet or the forwarding information of the first ICN packet after the first ICN packet is stored locally. For example, the record table may also be achieved by the following embodiments.

When the first ICN packet is an Interest packet and the second ICN packet is a Data packet, the record pointed to by the first offset address may be used to store the storage address of the second ICN packet when the second ICN packet is stored locally, and to store the forwarding information of the first ICN packet when the first ICN packet is stored locally.

When the first ICN packet is a Data packet and the second ICN packet is an Interest packet, the record pointed to by the first offset address may be used to store the forwarding information of the second ICN packet when the second ICN packet is stored locally, and to store the storage address of the first ICN packet when the first ICN packet is stored locally.

As an example, Interest 1 and Data 1 may correspond to the same first offset address, i.e., offset address 11. Interest 2 and Data 2 may correspond to the same first offset address, i.e., offset address 12. Interest 3 and Data 3 may correspond to the same first offset address, i.e., offset address 13. Table 3 is example three of the record table. When no Data 2 is currently stored and no forwarding information of Interest 3 is currently stored, the contents recorded in the record table may be as shown in Table 3.

TABLE 3

| offset address | forwarding information of Interest packet | storage address of Data packet in CS |
| --- | --- | --- |
| offset address 11 | forwarding information of Interest 1 | storage address of Data 1 |
| offset address 12 | forwarding information of Interest 2 | — |
| offset address 13 | — | storage address of Data 3 |

It should be noted that, in the record table shown in Table 3, the related information of the Data packet corresponding to the Interest packet is stored in the record pointed to by the offset address corresponding to the Interest packet, and the related information of the Interest packet corresponding to the Data packet is also stored in the record pointed to by the offset address corresponding to the Data packet. Therefore, when receiving any first ICN packet of the Interest packet or the Data packet, the node may obtain the related information of the corresponding second ICN packet by retrieving the same record table, such as forwarding information, storage address or whether the second ICN packet is stored. With this embodiment, the problems caused by repeated retrieval can be avoided when the Interest packets and Data packet are received, and the retrieval efficiency of the node can be improved.

In other embodiments of the present invention, after acquiring the first offset address, a step of writing the forwarding information or the storage address of the first ICN packet into the record pointed to by the first offset address may be further included.

For example, querying the record pointed to by the first offset address and performing the data processing according to the query result may further include: updating the forwarding information of the first ICN packet stored in the record pointed to by the first offset address in response to the record pointed to by the first offset address not storing the storage address of the second ICN packet when the first ICN packet is an Interest packet; and/or, caching the first ICN packet in response to the record pointed to by the first offset address stores the forwarding information of the second ICN packet when the first ICN packet is a Data packet, and writing the storage address of the first ICN packet into the record pointed to by the first offset address.

In an embodiment of the present invention, a combination of the above two embodiments for acquiring the first offset address may be adopted as another embodiment for acquiring the first offset address corresponding to the first ICN packet. Acquiring the first offset address corresponding to the first ICN packet by adopting the combination of the above embodiments for acquiring the first offset address can ensure that the first ICN packet and the second ICN packet correspond to the same offset address. That is, the offset address corresponding to the first ICN packet determined according to the above combination mode is the same as the second offset address corresponding to the second ICN packet corresponding to the first ICN packet.

In an embodiment of the present invention, the first offset address is determined by the combination of the above examples. Since the first ICN packet and the second ICN packet corresponding to the first ICN packet correspond to the same first offset address, the node may obtain the corresponding second ICN packet by retrieving the same record table when receiving any first ICN packet of the Interest packet or the Data packet.

In other embodiments of the present invention, after acquiring the first offset address corresponding to the first ICN packet and storing the forwarding information or the storage address of the first ICN packet in the record pointed to by the first offset address, the method may further include the following steps: acquiring a third offset address corresponding to a third ICN packet; querying a record pointed to by the third offset address and performing data processing according to a query result; when the third offset address is the same as the first offset address, querying the record pointed to by the third offset address and performing the data processing according to the query result may include: querying that the record pointed to by the third offset address stores the forwarding information of the first ICN packet if the first ICN packet is an Interest packet and the third ICN is a Data packet requested by the first ICN packet, and returning the third ICN packet according to the queried forwarding information of the first ICN packet; querying that the record pointed to by the third offset address stores the storage address of the first ICN packet if the first ICN packet is a Data packet and the third ICN packet is an Interest packet requesting the first ICN packet, reading the first ICN packet from a storage space pointed to by the queried storage address of the first ICN packet, and returning the read first ICN packet according to forwarding information of the third ICN packet.

In other embodiments of the present invention, the step S301 to step S302 of the method may be performed by an off-chip memory in the node, and the details of related technical schemes may be described in other embodiments.

Furthermore, in the technical schemes provided by the embodiments of the present invention, the record pointed to by the first offset address is used to store the storage address of the second ICN packet or the forwarding information of the second ICN packet when the second ICN packet corresponding to the first ICN packet is stored locally, and is also used to store the storage address of the first ICN packet or the forwarding information of the first ICN packet after the first ICN packet is stored locally, so that the problems caused by repeated retrieval of nodes in ICN can be avoided when the Interest packet and the Data packet are received, and therefore the retrieval efficiency of nodes can be improved.

Embodiment Two

On the basis of any of the methods shown in the above embodiments, an embodiment of acquiring the first offset address corresponding to the first ICN packet is further provided. In an embodiment of the present invention, the first offset address corresponding to the first ICN packet may further be acquired by using a preset positioning function. The positioning function may be used to determine a position of a flag bit corresponding to the input ICN packet in an index unit.

For example, the step of acquiring the first offset address corresponding to the first ICN packet may include: (1) determining the position of the flag bit corresponding to the first ICN packet in the index unit according to the positioning function. (2) determining the first offset address corresponding to the first ICN packet according to the position of the flag bit corresponding to the first ICN packet.

As an example, the positioning function may include K hash functions, and the index unit may include M flag bits. After receiving the first ICN packet, the node inputs an identification of the first ICN packet into K positioning functions to obtain K positions. Then the first offset address may be an M-bit address, where the values of the flag bits of K positions obtained from the identification of the first ICN packet are all set to 1, and the values of the flag bits except the K positions are set to be 0.

For example, when K is 3 and M is 6, the flag bits corresponding to the first ICN packet may be 2, 4, and 5, and then the first offset address may be 010110, where the 2nd, 4th and 5th bits are 1, and the 1st, 3rd and 6th bits are 0.

In other embodiments of the present invention, the value of the flag bit in the index unit may be used to indicate whether an Interest packet and/or a Data packet corresponding to the flag bit is stored locally.

Embodiment Three

Figure 4A:
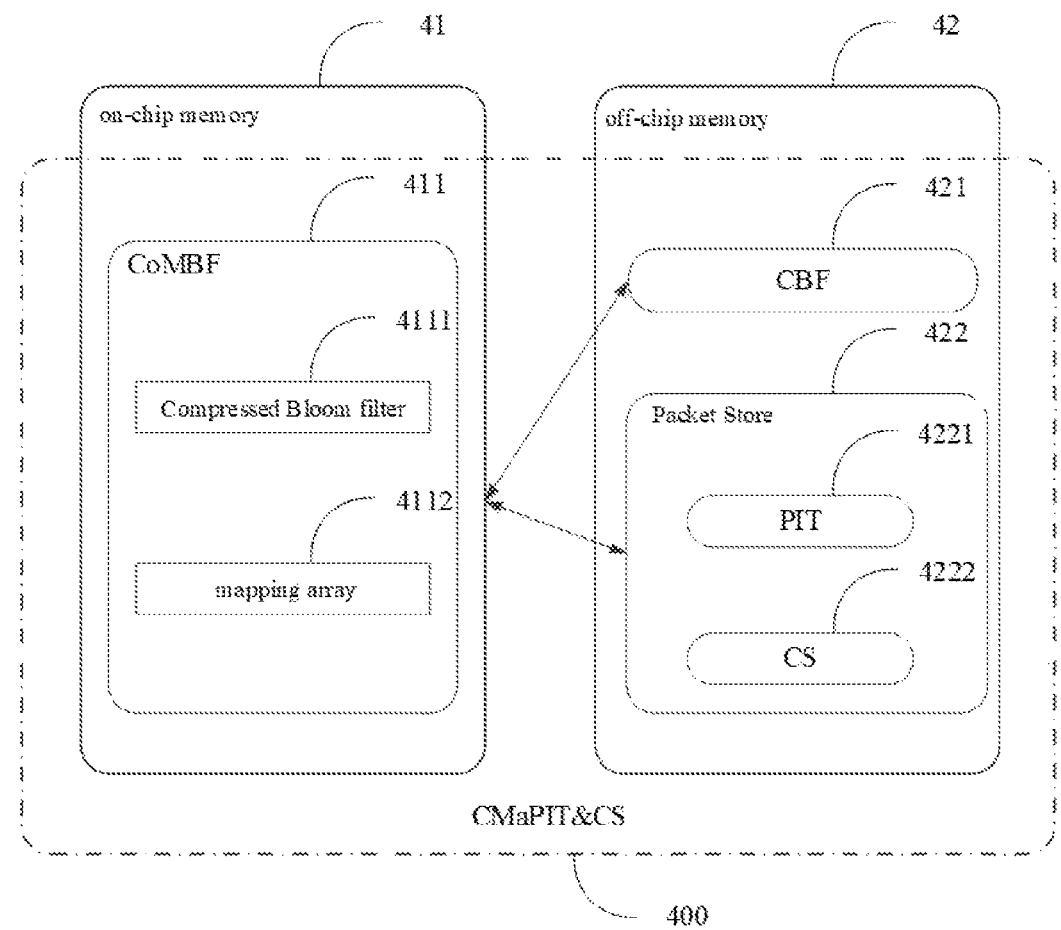
FIG. 4A is a schematic structural diagram I of a node according to an embodiment of the present invention.

According to some embodiments of the invention, a structure of an ICN node is further provided. This structure may be used to perform the data processing method provided by any of the above embodiments. FIG. 4A is a schematic structural diagram I of the node according to some embodiments of the present invention. A Pending Interest Table and Content Store via Compressed Mapping Bloom filter (CMaPIT&CS) 400 may be set in the node, and the CMaPIT&CS may be a memory with processing capability. The CMaPIT&CS may also be called a joint storage structure, which includes an on-chip memory 41 and an off-chip memory 42. In other embodiments of the present invention, the on-chip memory 41 may adopt a high-speed memory, and the off-chip memory may adopt a low-speed memory.

Figure 4B:
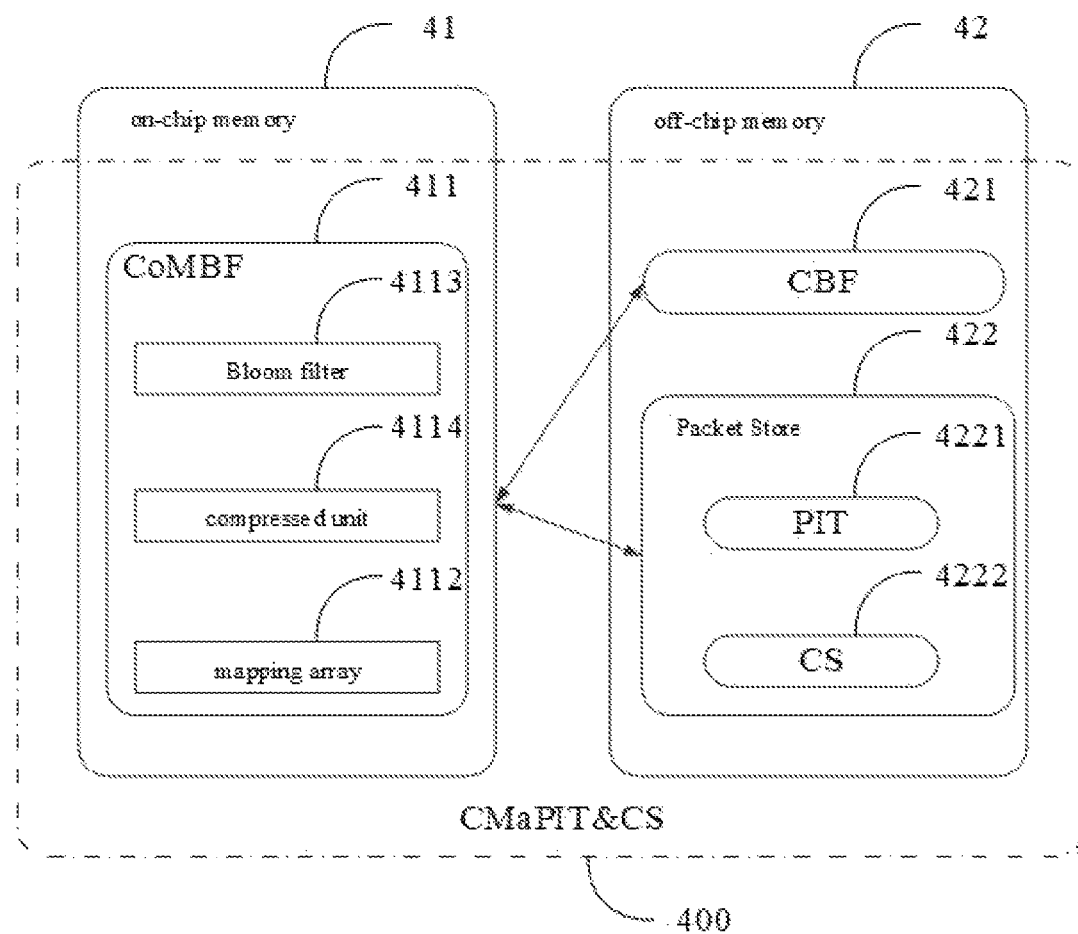
FIG. 4B is a schematic structural diagram II of the node according to an embodiments of the present invention.

In an embodiment of the present invention, a Compressed Mapping Bloom filter (CoMBF) 411 may be deployed on the on-chip memory 41 to realize data retrieval and index, and the data stored in the CoMBF may also be called an index unit. The CoMBF 411 may be composed of two parts: a Compressed Bloom filter 4111 containing m bits, and a Mapping Array (MA) 4112 containing j bits, where the MA 4112 and the compressed bloom filter 4111 may have the same structure and may both be in the form of bit array. In other embodiments of the present invention, the CoMBF may also be composed of three parts: a Bloom filter 4113, a Compresses Unit, and a MA 4112. FIG. 4B is a schematic structural diagram of the node according to some embodiments of the present invention. The Compresses Unit may be used to realize compressed sensing of the flag bits.

In an embodiment of the present invention, a counting bloom filter (CBF) 421 data structure corresponding to the CoMBF 4111 may be deployed on the off-chip memory 42 to update and delete data. In addition, a Packet Store 422 may be disposed on the off-chip memory 42 to store the forwarding information of PIT and the storage position of the Data packet in the CS, so as to realize the integration of the index structure of PIT and the index structure of CS. In other embodiments of the present invention, the Packet Store may be a static storage. In another embodiment of the present invention, the Packet Store 222 may store the PIT 4221 and the CS 4222.

In an embodiment of the present invention, the Packet Store may be used to store data in the PIT and the CS, and the record pointed to by the first offset address may be a record in the PIT.

In an embodiment of the present invention, the CoMBF 411 may represent a set of element(s), which is used to realize the basic function of element retrieval, that is, to determine whether a data element is in the data set represented by the CoMBF. At the same time, the data compression function of the Compressed Bloom filter 4111 may effectively reduce the amount of data transmission in the network. By transmitting a bit array of the Compressed Bloom filter in the network, the CoMBF 411 can have the functions of network data transmission and data sharing.

In other embodiments of the present invention, when an Interest packet arrives at the forwarding plane, the name of the Interest packet may be first input into the CMaPIT&CS. Then, in the CoMBF, exact string matching is carried out on the name of the Interest packet. If there is a matched entry in the CoMBF, the Packet Store is accessed according to the offset address output by the CoMBF. Then, whether a corresponding record in the Packet Store records a pointer to the CS is checked. If there is a pointer to the CS, which indicates that the CS contains the Data packet corresponding to the Interest packet, the Data packet may be read. If there is no pointer to the CS, the forwarding information of the Interest packet of the record in the Packet Store is updated to wait for an arrival of the Data packet.

When the Data packet arrives at the forwarding plane, the name of the Data packet is first input into the CMaPIT&CS. Then, in the CoMBF, exact string matching is carried out on the name of the Data packet. If there is a matched entry in the CoMBF, the Packet Store is accessed according to the offset address output by the CoMBF, the forwarding information of the corresponding Interest packet is read, and the Data packet is returned. At the same time, the storage location of the Data packet in the CS is recorded in the Packet Store. If there is no matched entry in the CoMBF, the Data packet is directly discarded.

Embodiment Four

Figure 5:
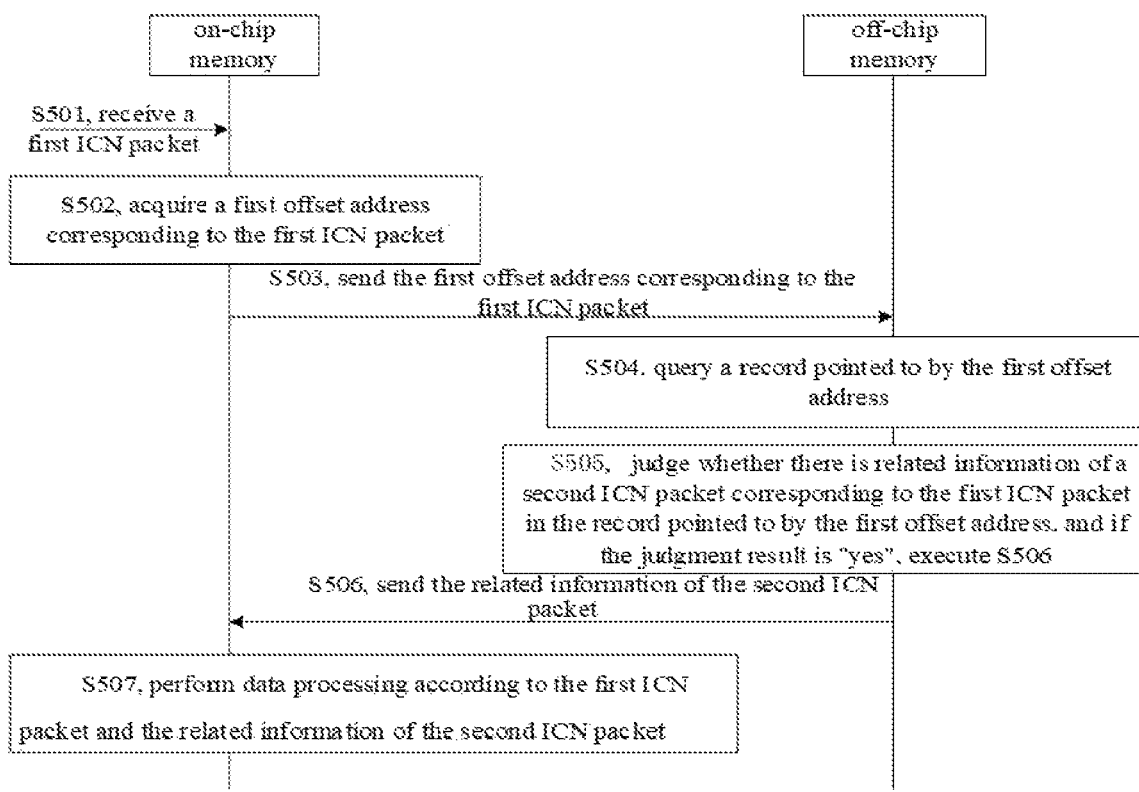
FIG. 5 is an interactive flowchart I of a data processing method according to an embodiment of the present invention.

On the basis of any of the data processing methods shown in the above embodiments, a data processing method is further provided. FIG. 5 is an interactive flowchart I of the data processing method according to some embodiments of the present invention. As shown in FIG. 5, the execution subject of the embodiment of the present invention may be an on-chip memory and an off-chip memory, and the steps of an embodiment of the present invention may include:

At step S501, the on-chip memory receives a first ICN packet.

Where, the first ICN packet may be an Interest packet or a Data packet.

At step S502, the on-chip memory acquires a first offset address corresponding to the first ICN packet.

Where, the first offset address may be acquired by any of the acquisition methods described in the above embodiments.

At step S503, the on-chip memory sends the first offset address corresponding to the first ICN packet to the off-chip memory.

At step S504, the off-chip memory queries a record pointed to by the first offset address.

At step S505, the off-chip memory judges whether there is related information of a second ICN packet corresponding to the first ICN packet in the record pointed to by the first offset address, and if the judgment result is "yes", S506 is executed.

At step S506, the off-chip memory sends the related information of the second ICN packet.

At step S507, the on-chip memory performs data processing according to the first ICN packet and the related information of the second ICN packet.

Other technical scheme details and technical effects of the embodiment of the present invention may be described in other embodiments.

Figure 6:
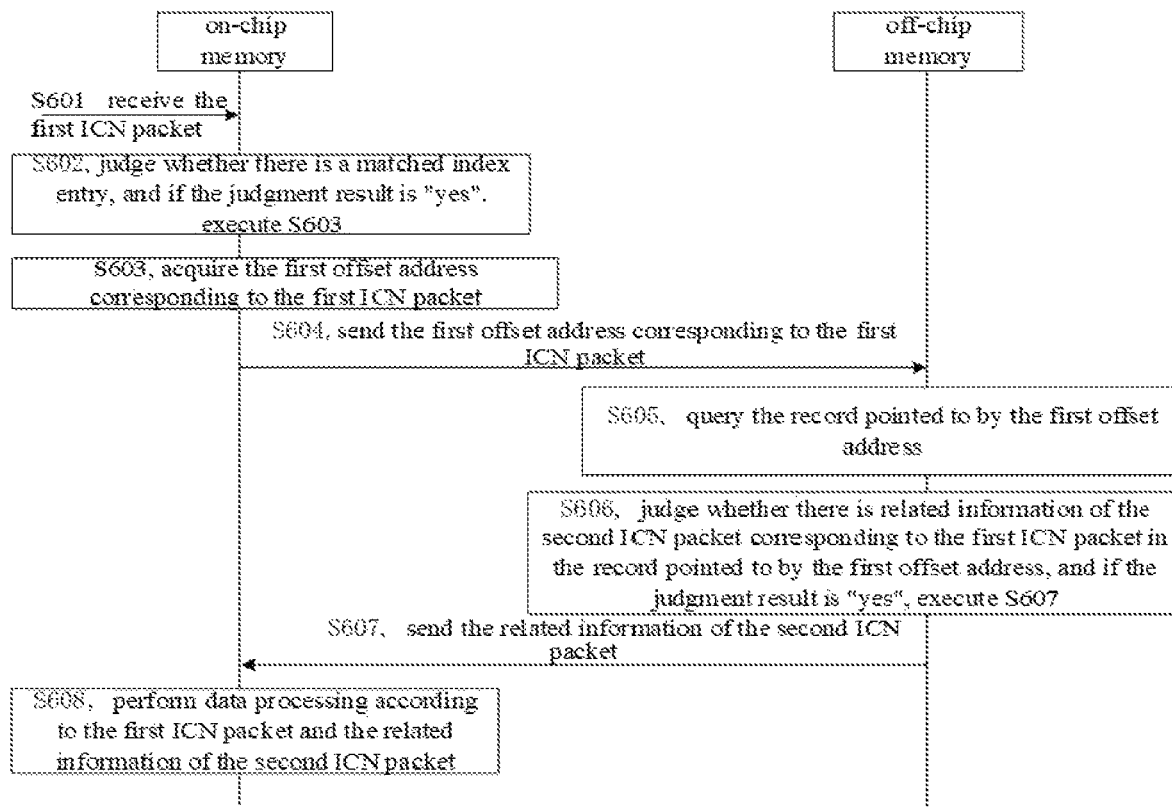
FIG. 6 is an interactive flowchart II of a data processing method according to an embodiment of the present invention.

In other embodiments of the present invention, before step S502, a step of the on-chip memory judging whether there is a matched index entry is further included, and if the judgment result is "yes", the step of acquiring the first offset address corresponding to the first ICN packet is performed. FIG. 6 is an interactive flowchart II of the data processing method according to some embodiments of the present invention. As shown in FIG. 6, the steps of an embodiment of the present invention may include:

At step S601, the on-chip memory receives a first ICN packet.

At step S602, the on-chip memory judges whether there is a matched index entry, and if the judgment result is "yes", S603 is executed.

Where, according to some embodiments of the invention, two embodiments of judging whether there is a matched index entry are provided.

In the first embodiment of judging whether there is a matched index entry provided by the embodiments of the present invention, if the first ICN packet is a Data packet and the second ICN packet is an Interest packet, judging whether there is the index entry matched with the identification of the first ICN packet may include: determining a position of a flag bit corresponding to the first ICN packet in an index unit according to a positioning function, a value of the flag bit in the index unit is used to indicate whether a data packet corresponding to the flag bit is stored locally; querying the value of the flag bit corresponding to the first ICN packet; and determining that there is the index entry matched with the identification of the first ICN packet if the value of the flag bit corresponding to the first ICN packet is valid.

In the first embodiment of judging whether there is a matched index entry provided by the embodiments of the present invention, if the first ICN packet is an Interest packet and the second ICN packet is a Data packet requested by the first ICN packet, judging whether there is the index entry matched with the identification of the first ICN packet may include: determining a position of a flag bit corresponding to the second ICN packet corresponding to the first ICN packet in an index unit according to a positioning function; querying a value of the flag bit corresponding to the second ICN packet; and determining that there is the index entry matched with the identification of the first ICN packet if the value of the flag bit corresponding to the second ICN packet is valid.

In the second embodiment of judging whether there is a matched index entry provided by the embodiments of the present invention, an index entry table may be used to determine whether there is an index entry corresponding to the ICN packet.

Table 4 is an example of the index entry table provided by the embodiments of the present invention. Each index entry may include multiple attributes, such as the identification of the index entry, the Interest packet corresponding to the index entry, whether the Interest packet corresponding to the index entry is stored locally, the Data packet corresponding to the index entry, and whether the Data packet corresponding to the index entry is stored locally, etc. The identification of the index entry may be the number of the index entry or the combination of the Data packet and the Interest packet corresponding to the index entry. It should be noted that, in the index entry table, the first ICN packet and the second ICN packet corresponding to the first ICN packet may correspond to index entries with the same identification. That is, the Data packet and the Interest packet requesting the Data packet may correspond to index entries with the same identification.

TABLE 4

| Number of index entry | Data packet corresponding to index entry | Interest packet corresponding to index entry | Whether the Interest packet corresponding to the index entry is stored locally | Whether the Data packet corresponding to the index entry is stored locally |
| --- | --- | --- | --- | --- |
| Index entry 1 | Data 1 | Interest 1 | yes | no |
| Index entry 2 | Data 2 | Interest 2 | yes | yes |
| Index entry 3 | Data 3 | Interest 3 | no | yes |

As shown in Table 4, Data 1 and Interest 1 requesting Data 1 may correspond to index entry 1, Data 2 and Interest 2 requesting Data 2 may correspond to index entry 2, and Data 3 and Interest 3 requesting Data 3 may correspond to index entry 3. Interest packets stored at nodes include Interest 1 and Interest 2, and Data packets stored at nodes include Data 2 and Data 3.

Based on the index entry table illustrated in Table 4, judging whether there is the index entry matched with the identification of the first ICN packet may include: judging whether the index entry corresponding to the first ICN packet indicates that the second ICN packet is stored locally if the first ICN packet is a Data packet and the second ICN packet is an Interest packet, that is, judging whether the attribute of "whether the Interest packet corresponding to the index entry is stored locally" is "yes", and determining that there is an index entry matched with the identification of the first ICN packet if the judgment result is "yes".

judging whether the index entry corresponding to the first ICN packet indicates that the second ICN packet is stored locally if the first ICN packet is an Interest packet and the second ICN packet is a Data packet requested by the first ICN packet, that is, judging whether the attribute of "whether the Data packet corresponding to the index entry is stored locally" is "yes", and determining that there is an index entry matched with the identification of the first ICN packet if the judgment result is "yes".

In other embodiments of the present invention, the attribute values of the above attributes of "whether the Data packet corresponding to the index entry is stored locally" and "whether the Interest packet corresponding to the index entry is stored locally" may be expressed in numerical forms, for example, "1" or "valid" means "yes", and "0" or "invalid" means "no". The embodiments of the present invention are not limited to this.

At step S603, the on-chip memory acquires a first offset address corresponding to the first ICN packet.

At step S604, the on-chip memory sends the first offset address corresponding to the first ICN packet to an off-chip memory.

At step S605, the off-chip memory queries a record pointed to by the first offset address.

At step S606, the off-chip memory judges whether there is related information of a second ICN packet corresponding to the first ICN packet in the record pointed to by the first offset address, and if the judgment result is "yes", S607 is executed.

At step S607, the off-chip memory sends the related information of the second ICN packet to the on-chip memory.

At step S608, the on-chip memory performs data processing according to the first ICN packet and the related information of the second ICN packet.

In the embodiments of the present invention, it should be noted that the above step S602 is equivalent to a trigger condition for acquiring the first offset address corresponding to the first ICN packet in step S603. That is, the step of acquiring the first offset address corresponding to the first ICN packet may be performed when there is an index entry matched with the identification of the first ICN packet.

The index entry may be such data as: (1) if the first ICN packet is stored locally, the index entry corresponding to the first ICN packet records "ICN 1 locally"; (2) if the second ICN packet is stored locally, the index entry corresponding to the second ICN packet records "ICN 2 locally"; and (3) the index entry corresponding to the first ICN packet and the index entry corresponding to the index entry corresponding to the second ICN packet are the same index entry.

In other embodiments of the present invention, the index entry corresponding to the ICN packet may be determined according to the identification of the ICN packet. For example, the position of the flag bit determined according to the identification of the ICN packet is used as the identification of the index entry in the index entry table.

As an example, the structure of the index entry table may be similar to that of the record table pointed to by the offset address.

In the embodiments of the present invention, steps S601, S603 to S608 are similar to steps S501 to S507.

Figure 7A:
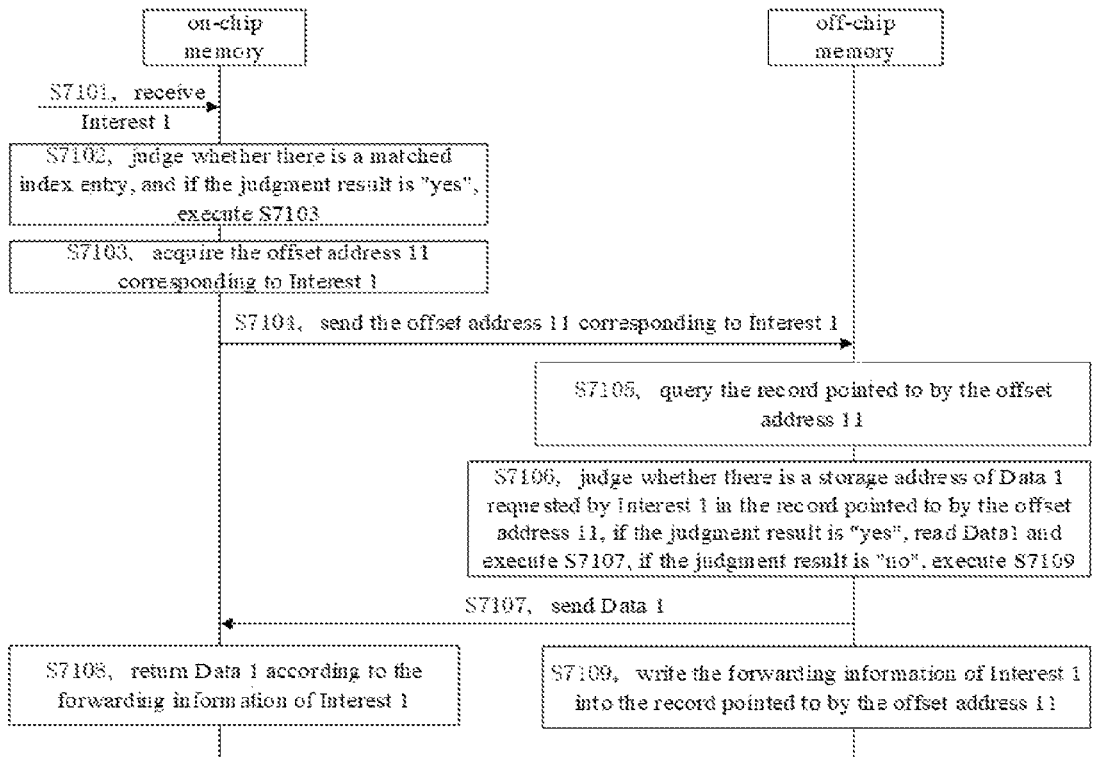
FIG. 7A is an interactive flowchart III of a data processing method according to an embodiment of the present invention.

According to some embodiments of the present invention, a data processing method is further provided, in which the first ICN packet may be Interest 1 packet, and the second ICN packet corresponding to the first ICN packet may be Data 1. FIG. 7A is an interactive flowchart III of the data processing method according to some embodiments of the present invention. As shown in FIG. 7A, the steps of the data processing method provided by an embodiment of the present invention may include:

At step S7101, the on-chip memory receives Interest 1.

At step S7102, the on-chip memory judges whether there is a matched index entry, and if the judgment result is "yes", S7103 is executed.

This step may refer to the description of S602.

At step S7103, the on-chip memory acquires offset address 11 corresponding to Interest 1.

At step S7104, the on-chip memory sends offset address 11 corresponding to Interest 1 to an off-chip memory.

At step S7105, the off-chip memory queries a record pointed to by offset address 11.

At step S7106, the off-chip memory judges whether there is a storage address of Data 1 requested by Interest 1 in the record pointed to by the offset address 11; if the judgment result is "yes", Data 1 is read and S7107 is executed; and if the judgment result is "no", S7109 is executed.

At step S7107, the off-chip memory sends Data 1.

At step S7108, the on-chip memory returns Data 1 according to forwarding information of Interest 1.

At step S7109, the off-chip memory writes the forwarding information of Interest 1 into the record pointed to by the offset address 11.

Other technical scheme details and technical effects of embodiments of the present invention may be described in other embodiments.

Figure 7B:
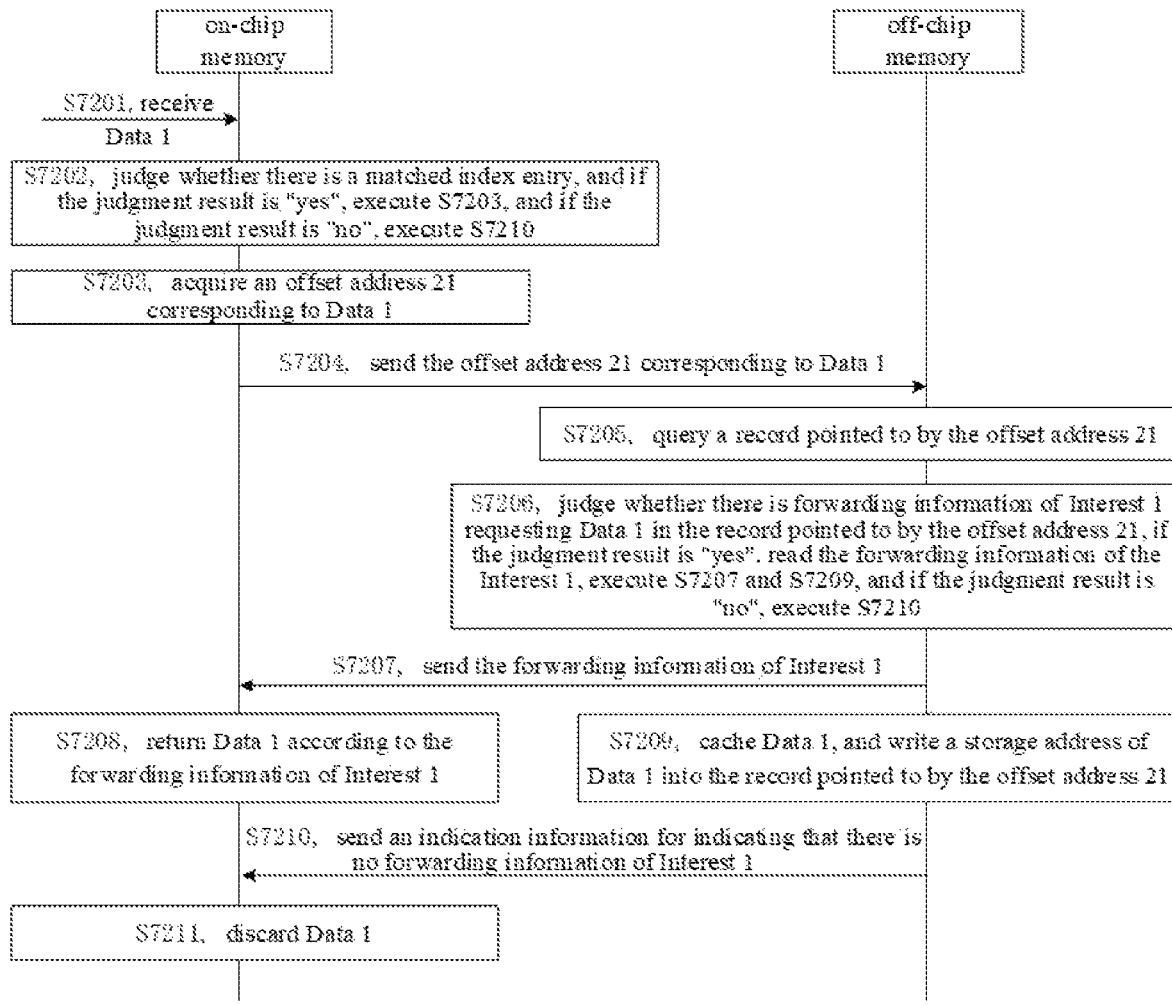
FIG. 7B is an interactive flowchart IV of a data processing method according to an embodiment of the present invention.

According to some embodiments of the present invention, a data processing method is further provided, in which the first ICN packet may be Data 1 packet, and the second ICN packet corresponding to the first ICN packet may be Interest 1. FIG. 7B is an interactive flowchart IV of the data processing method according to some embodiments of the present invention. As shown in FIG. 7B, the steps of the data processing method provided by an embodiment of the present invention may include:

At step S7201, the on-chip memory receives Data 1.

At step S7202, the on-chip memory judges whether there is a matched index entry; if the judgment result is "yes", S7203 is executed; and if the judgment result is "no", S7210 is executed.

This step may refer to the description of S602.

At step S7203, the on-chip memory acquires offset address 21 corresponding to Data 1.

At step S7204, the on-chip memory sends offset address 21 corresponding to Data 1 to an off-chip memory.

At step S7205, the off-chip memory queries a record pointed to by offset address 21.

At step S7206, the off-chip memory judges whether there is forwarding information of Interest 1 requesting Data 1 in the record pointed to by offset address 21; if the judgment result is "yes", the forwarding information of the Interest 1 is read, S7207 and S7209 are executed; and if the judgment result is "no", S7210 is executed.

At step S7207, the off-chip memory sends the forwarding information of Interest 1 to the on-chip memory.

At step S7208, the on-chip memory returns Data 1 according to the forwarding information of Interest 1.

At step S7209, the off-chip memory caches Data 1, and writes a storage address of Data 1 into the record pointed to by the offset address 21.

At step S7209, the off-chip memory sends indication information for indicating that there is no forwarding information of Interest 1.

At step S7210, the on-chip memory discards Data 1.

Other technical scheme details and technical effects of embodiments of the present invention may be described in other embodiments.

Figure 7C:
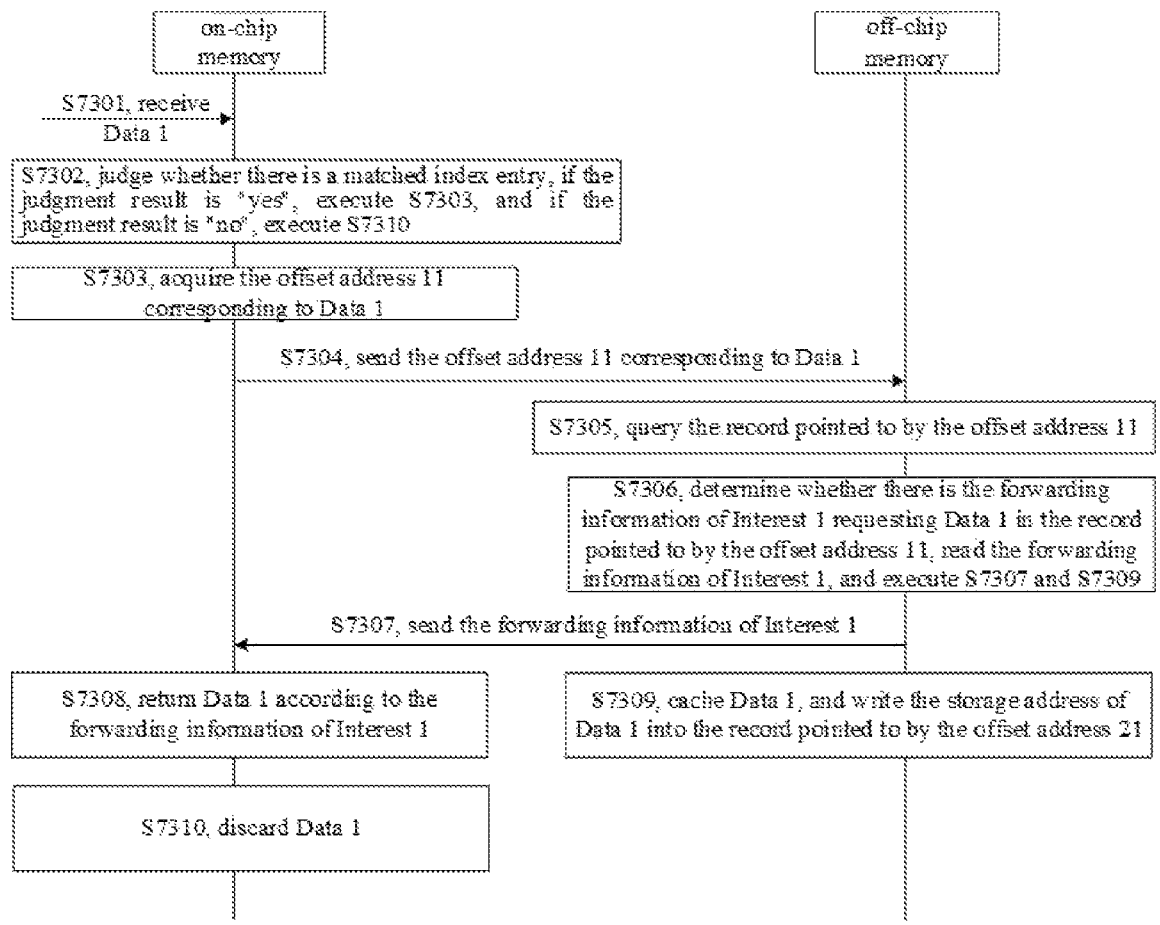
FIG. 7C is an interactive flowchart V of a data processing method according to an embodiment of the present invention.

On the basis of the method shown in FIG. 7A, a data processing method is further provided, and FIG. 7C is an interactive flowchart V of the data processing method according to some embodiments of the present invention. As shown in FIG. 7C, the steps of an embodiment of the present invention may include:

At step S7301, the on-chip memory receives Data 1.

In an embodiment of the present invention, this step may be performed after S7109.

At step S7302, the on-chip memory judges whether there is a matched index entry; if the judgment result is "yes", S7303 is executed; and if the judgment result is "no", S7310 is executed.

At step S7303, the on-chip memory acquires offset address 11 corresponding to Data 1.

At step S7304, the on-chip memory sends offset address 11 corresponding to Data 1.

At step S7305, the off-chip memory queries the record pointed to by offset address 11.

At step S7306, the off-chip memory determines whether there is the forwarding information of Interest 1 requesting Data 1 in the record pointed to by offset address 11, reads the forwarding information of Interest 1, and executes S7307 and S7309.

At step S7307, the off-chip memory sends the forwarding information of Interest 1.

At step S7308, the on-chip memory returns Data 1 according to the forwarding information of Interest 1.

At step S7309, the off-chip memory caches Data 1, and writes the storage address of Data 1 into the record pointed to by offset address 21.

At step S7310, the on-chip memory discards Data 1.

Other technical scheme details and technical effects of embodiments of the present invention may be described in other embodiments.

Embodiment Five

According to some embodiments of the present invention, a data processing method is further provided, which may be used to quickly determine which Data packets or Interest packets are stored locally, so that the node may quickly get the data packets or Interest packets stored locally, thereby improving the retrieval efficiency of the node. The embodiment may also be used to share the data stored on the node in the ICN network.

Figure 8:
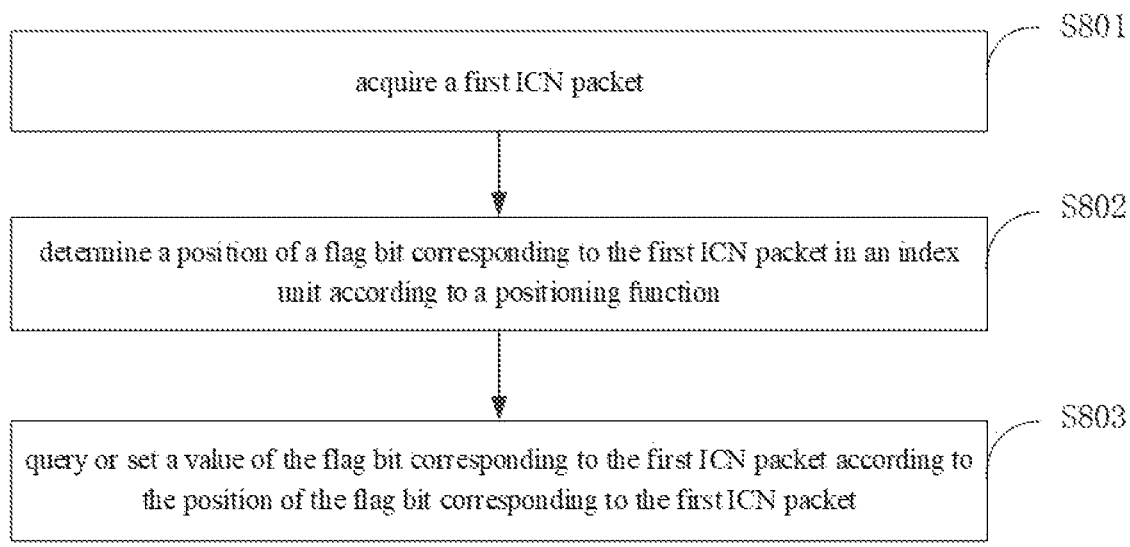
FIG. 8 is a flowchart II of a data processing method according to an embodiment of the present invention.

FIG. 8 is a flowchart II of a data processing method according to some embodiments of the present invention. As shown in FIG. 8, the steps of an embodiment of the present invention may include:

At step S801, a first ICN packet is acquired.

Where, the first ICN packet is an Interest packet or a Data packet.

At step S802, a position of a flag bit corresponding to the first ICN packet in an index unit is determined according to a positioning function.

At step S803, a value of the flag bit corresponding to the first ICN packet is queried or set according to the position of the flag bit corresponding to the first ICN packet.

Where, the value of the flag bit in the index unit is used to indicate whether an Interest packet and/or a Data packet corresponding to the flag bit is stored locally.

In an embodiment of the present invention, after the node receives an ICN packet and stores the related information of the ICN packet, the flag bit corresponding to the ICN packet in the index unit may be set to be valid. For example, querying or setting the value of the flag bit corresponding to the first ICN packet according to the position of the flag bit corresponding to the first ICN packet may include: setting the value of the flag bit corresponding to the first ICN packet to be valid when the first ICN packet is stored locally. As an example, the value of the flag bit corresponding to the ICN packet may be set to be valid after step S7109, S7209 or S7309. In other embodiments of the present invention, when a node has already stored some Data during the node is enabled, the flag bits corresponding to these Data packets may be set to be valid when the node is enabled.

In an embodiment of the present invention, the positioning function may be used to determine the position of the flag bit corresponding to any of ICN packets in the index unit. As an example, the position of the flag bit corresponding to the ICN packet in the index unit may be determined according to the identification of the ICN packet. For example, when the ICN packet is an Interest packet, the position of the flag bit corresponding to the Interest packet in the index unit may be determined according to the name of the Data packet requested by the Interest packet. When the ICN packet is a Data packet, the position of the flag bit corresponding to the Data packet in the index unit may be determined according to the name of the Data packet. For example, the positioning function may include K hash functions, and K results may be obtained by inputting the identification of the ICN packet into K hash functions respectively. As an example, K results may be K "1 s". As another example, K results may be 1 "0" and K−1 "1s", or K results may be 1 "10", 1 "11" and K−2 "00". In other embodiments of the present invention, K results may be arranged as M-bit binary numbers according to an order of the corresponding K positioning functions, and the M-bit binary numbers may be used as the offset addresses indicating the record table.

In an embodiment of the present invention, the index unit may be, for example, a bit array, an ICN packet may correspond to one bit or multiple bits in the index unit, and the flag bit corresponding to the ICN packet in the index unit is one bit or more bits. As an example, when the value of the bit corresponding to the ICN packet is 1, the flag bit corresponding to the ICN packet may be determined to be valid, and when the values of bits corresponding to the ICN packet are not all 0, the flag bit corresponding to the ICN packet may be determined to be invalid.

In other embodiments of the present invention, in order to reduce the number of flag bits, so as to reduce the storage space of the index unit and the transmission data amount of the index unit that needs to be transmitted during network sharing, an embodiment of using compressed flag bits as the corresponding flag bits of individual ICN packets may also be adopted.

For example, determining the position of the flag bit corresponding to the first ICN packet in the index unit according to the positioning function may also be performed by the following steps: first determining a position of an uncompressed flag bit mapped by the first ICN packet in the index unit according to the positioning function; then performing a compression sensing for the position of the uncompressed flag bit corresponding to the first ICN packet to obtain a position of a compressed flag bit corresponding to the first ICN packet; and then taking the position of the compressed flag bit corresponding to the first ICN packet as the position of the flag bit corresponding to the first ICN; a total number of uncompressed flag bits in the index unit is larger than a total number of compressed flag bits in the index unit. In other embodiments of the present invention, the total number of uncompressed flag bits may be M bits, such as 32 bits, and the total number of compressed flag bits may be N bits, such as 18 bits.

In an embodiment of the present invention, in order to share the information of which Data packets or which Interest packets are stored in this node with other nodes in the ICN network, after querying or setting the value of the flag bit corresponding to the first ICN packet according to the position of the flag bit corresponding to the first ICN packet, the method may further include: sending the index unit to other node(s).

In other embodiments of the present invention, the flag bit may be stored in the on-chip memory. As an example, each bit of the bit array in the Compressed Bloom filter of the on-chip memory may be used as the flag bit corresponding to the ICN packet stored at the node. Sending the index unit to other nodes may include: sending the bit array in the Compressed Bloom filter to other nodes. That is to say, when the forwarding plane needs to share the cached information in the CS, the information sharing may be completed by transmitting the bit array of the Compressed Bloom filter in the on-chip memory to the network.

In an embodiment of the present invention, determining the position of the flag bit corresponding to the first ICN packet in the index unit according to the positioning function may be performed by the following steps: determining the position of the flag bit corresponding to the first ICN packet according to an identification of a first Data packet and a positioning function if the first ICN packet is the first Data packet; determining the position of the flag bit corresponding to the first ICN packet according to an identification of a second Data packet and the positioning function if the first ICN packet is a second Interest packet and the Data packet requested by the second Interest packet is the second Data packet.

In other embodiments of the present invention, after querying or setting the value of the flag bit corresponding to the first ICN packet according to the position of the flag bit corresponding to the first ICN packet, the method may further include:

determining the first offset address corresponding to the first ICN packet according to the position of the flag bit corresponding to the first ICN packet, where the record pointed to by the first offset address is used to store forwarding information or a storage address of the second ICN packet corresponding to the first ICN packet; and then, querying the record pointed to by the first offset address corresponding to the first ICN packet and performing data processing according to a query result. The embodiment of the step of querying the record pointed to by the first offset address corresponding to the first ICN packet and performing the data processing according to the query result may refer to the related descriptions in other embodiments of the present invention.

In other embodiments of the present invention, before determining the first offset address corresponding to the first ICN packet according to the position of the flag bit corresponding to the first ICN packet, the method may further include: determining whether the flag bit of the second ICN packet corresponding to the first ICN packet is valid; and determining the first offset address corresponding to the first ICN packet according to the position of the flag bit corresponding to the first ICN packet if the flag bit of the second ICN packet corresponding to the first ICN packet is valid.

It should be noted that, after receiving the first ICN packet, the node may preliminarily confirm whether the node may store the second ICN packet by querying the value of the flag bit corresponding to the second ICN packet in the index unit. If there may be the second ICN packet, the offset address is determined according to the value of the flag bit corresponding to the second ICN packet. The record table pointed to by the offset address is stored in the off-chip memory, the record pointed to by the offset address is queried, and then the data processing is performed according to the query result.

Through the above algorithm description, it can be found that the CMaPIT&CS storage structure can effectively simplify the retrieval process of name data, and reduce the retrieval frequency of index structure in the on-chip memory and the access times of slow memory in the off-chip memory. At the same time, it can be clearly observed that in CMaPIT&CS, the retrieval time complexity of both Interest packets and Data packets is determined by CoMBF, and the time complexity is.

Figure 9:
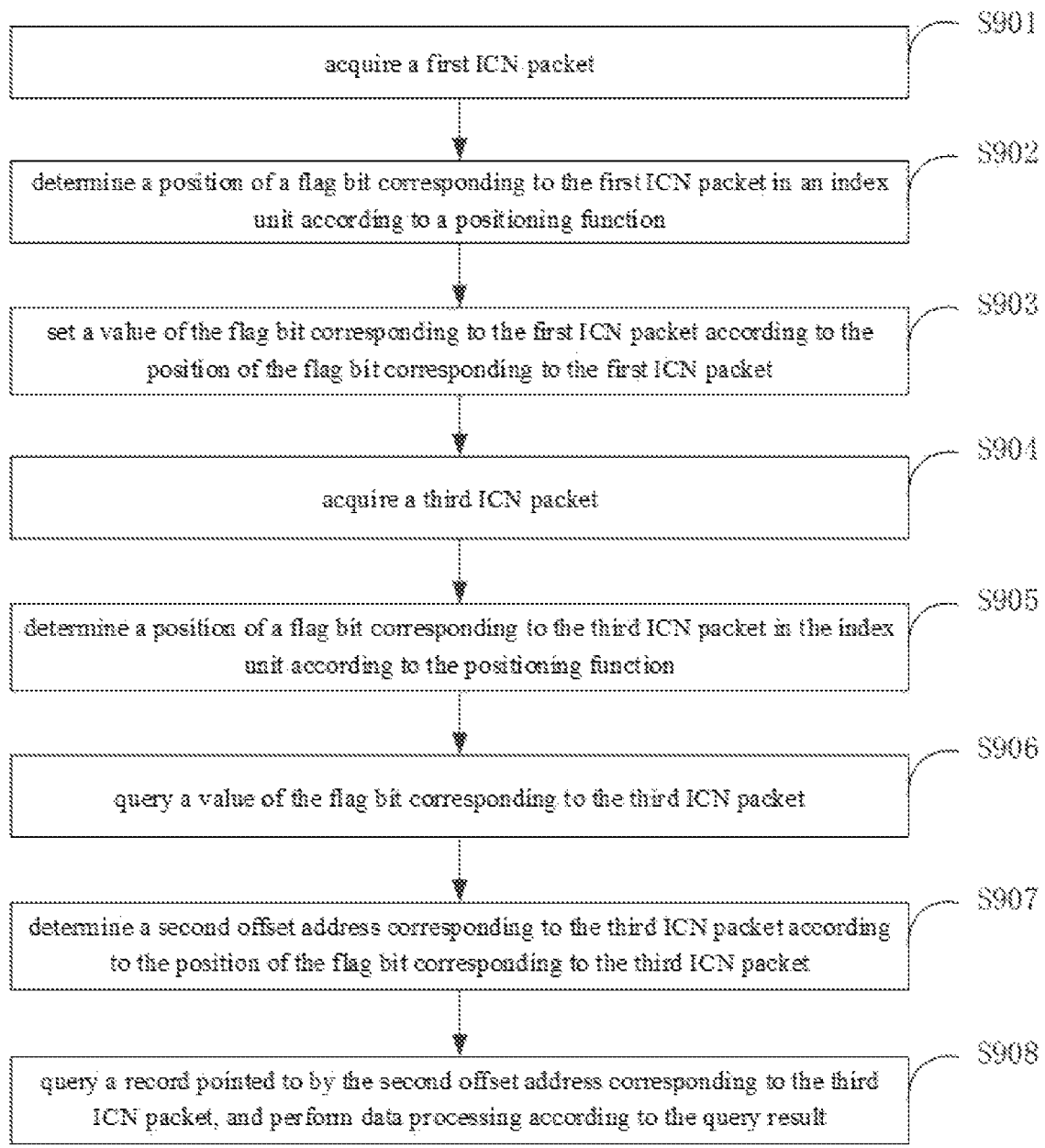
FIG. 9 is a flowchart III of a data processing method according to an embodiment of the present invention.

On the basis of the above embodiments, a data processing method is further provided. FIG. 9 is a flowchart III of the data processing method according to some embodiments of the present invention. After determining the position of the flag bit corresponding to the first ICN packet in the index unit according to the positioning function, the method of the embodiment of the present invention may further include the following steps.

At step S901, a first ICN packet is acquired.

Where, this step is similar to S801.

At step S902, a position of a flag bit corresponding to the first ICN packet in an index unit is determined according to a positioning function.

Where, this step is similar to S802.

At step S903, a value of the flag bit corresponding to the first ICN packet is set according to the position of the flag bit corresponding to the first ICN packet.

Where, this step is similar to S803.

At step S904, a third ICN packet is acquired.

Where, the third ICN packet may be either an Interest packet or a Data packet.

At step S905, a position of a flag bit corresponding to the third ICN packet in the index unit is determined according to the positioning function.

In an embodiment of the present invention, the positioning function may include K hash functions, so the position of the flag bit corresponding to the third ICN packet in the index unit is determined by adopting the following embodiment. For example, an identification of the ICN packet may be input into K hash functions, the calculation results of the K hash functions are arranged into binary numbers in the order of the K hash functions, and the bit position with the bit value of 1 in the binary numbers is taken as the position of the flag bit corresponding to the ICN packet in the index unit.

At step S906, a value of the flag bit corresponding to the third ICN packet is queried.

In an embodiment of the present invention, after determining the position of the flag bit corresponding to the third ICN packet in the index unit according to the positioning function, the method of the embodiments of the present invention may further include the following steps.

At step S907, a second offset address corresponding to the third ICN packet is determined according to the position of the flag bit corresponding to the third ICN packet.

At step S908, a record pointed to by the second offset address corresponding to the third ICN packet is queried, and data processing is performed according to a query result.

Where, the record pointed to by the second offset address may be used to store forwarding information or a storage address of a fourth ICN packet corresponding to the third ICN packet.

In an embodiment of the present invention, if the third ICN packet is a Data packet, determining the flag bit corresponding to the third ICN packet in the index unit according to the positioning function may include: determining the flag bit corresponding to the third ICN packet according to the positioning function and an identification of the third ICN packet; correspondingly, querying the value of the flag bit corresponding to the third ICN packet may include: querying whether the value of the position of the flag bit corresponding to the third ICN packet in the index unit is valid; acquiring the second offset address corresponding to the third ICN packet according to the identification of the third ICN packet if the value of the position of the flag bit corresponding to the third ICN packet in the index unit is valid; and returning the third ICN packet according to the forwarding information of the Interest packet requesting the third ICN packet if forwarding information of the Interest packet requesting the third ICN packet is stored in the record pointed to by the second offset address.

In an embodiment of the present invention, if the third ICN packet is an Interest packet; acquiring the second offset address may include: determining the flag bit corresponding to the third ICN packet according to the positioning function and an identification of the Data packet requested by the third ICN packet; correspondingly, querying the value of the flag bit corresponding to the third ICN packet may include: querying whether the value of the position of the flag bit corresponding to the third ICN packet in the index unit is valid; acquiring the second offset address corresponding to the third ICN packet according to the identification of the third ICN packet if the value of the position of the flag bit corresponding to the third ICN packet in the index unit is valid; and reading the Data packet requested by the third ICN packet from a storage address of the Data packet requested by the third ICN packet if the storage address of the Data packet requested by the third ICN packet is stored in the record pointed to by the second offset address, and returning the Data packet requested by the third ICN packet according to the forwarding information of the third ICN packet.

It should be noted that the same steps or concepts in this embodiment as those in other embodiments may be explained with reference to the descriptions in other embodiments. Other technical effects of the embodiments of the present invention may refer to the descriptions in other embodiments, and will not be repeated here.

Embodiment Six

The data processing method provided by an embodiment of the present invention will be exemplified below.

In an example, the process of retrieving the Interest packet in the CMaPIT&CS storage structure may be as follows.

In this storage structure, K=3 hash functions are set, the size of the Bloom filter in the CoMBF data structure is set to 32 bits, the size of the Compressed Unit is set to 18 bits, and the Compressed Unit is equally divided into 6 parts. The mapping array (MA) corresponding to the storage structure is set to 6 bits, that is, the storage structure may store 26 elements in the Packet Store. It should be noted that the equal fraction of the Compressed Unit and the bit number of the MA need to be the same.

In this system, two Interest packets named/ndn/UA/videos and/ndn/UA/maps are input into the storage structure in turn. Where, the MA will be initialized to all-0 state before each input of the Interest packet. It should be noted that the two Interest packets named/ndn/UA/videos and/ndn/UA/maps mean that the names of the Data packets requested by the two Interest packets are/ndn/UA/videos and/ndn/UA/maps, respectively.

When the first Interest packet is input, the name/ndn/UA/videos of the Interest packet is first input into the CMaPIT&CS storage structure. The 6th, 14th and 20th Bits in the Bloom filter are hashed and mapped, and the three bits are all 1, which means that the Interest packet exists in the structure. After compressed sensing, there is a hash map in the 2th, 4th and 5th parts of the Compressed Unit, so the values of the 2th, 4th and 5th bits of the MA will be set to 1, and the values of other positions will be 0. Finally, the value of the MA is 010110, that is, the offset address of the Interest packet in the Packet Store is 010110. Then, the corresponding record of the Packet Store having recorded a pointer to CS is checked, that is, there is a Data packet corresponding to the first Interest packet, and finally the Data packet is read. It should be noted that the corresponding record of the Packet Store refers to the record in the record table pointed to by the offset address.

In the same way, the Interest packet named/ndn/UA/maps also exists in the storage structure, and the offset address of the Interest packet in the Packet Store is 110100. Then, the corresponding record of the Packet Store having not recorded a pointer to CS is checked, that is, there is no Data packet corresponding to the second Interest packet. Finally, the forwarding information of the Interest packet in this record is updated to wait for an arrival of the Data packet.

In another example, the process of retrieving Data packet in the CMaPIT&CS storage structure may be as follows.

In this storage structure, K=3 hash functions are used, the size of the Bloom filter in the CoMBF data structure is set to 32 bits, the size of the Compressed Unit is set to 18 bits, and the Compressed Unit is equally divided into 6 parts. The MA corresponding to the storage structure is set to 6 bits, so the storage structure may store 26 elements in the Packet Store.

In this system, two Data packets named/ndn/UA/maps and/TJU/videos are input in turn. The MA will be initialized to all-0 state before each input of the Data packet. It should be noted that the two Data packets named/ndn/UA/maps and/TJU/videos mean that the names of these two Data packets are/ndn/UA/maps and/TJU/videos, respectively.

When the first Data packet is input, the name/ndn/UA/maps of the Data packet is first input into the CMaPIT&CS storage structure. The 2nd, 5th and 16th bits in the Bloom filter are hashed and mapped, and the three bits are all 1, which means that the Data packet exists in the structure. After compressed sensing, there is a hash map in the 1st, 2nd and 4th parts of the Compressed Unit, so the values of the 1st, 2nd and 4th bits of the MA will be set to 1, and the values of other positions will be 0. Finally, the value of the MA is 110100, that is, the offset address of the Data packet in the Packet Store is 110100. Then, the corresponding record of Packet Store having recorded forwarding information of the corresponding Interest packet is checked, and the Data packet is returned according to the forwarding information. At the same time, the storage location of the Data packet in the CS is recorded in the Packet Store. In the same way, the 1st, 7th and 21st bits of the Data packet named/TJU/videos are hashed and mapped in the Bloom filter, but these three bits are not all 1, that is, there is no matched record in the CoMBF, so the Data packet is directly discarded. It should be noted that the corresponding record of the Packet Store refers to the record in the record table pointed to by the offset address.

It should be noted that the same steps or concepts in this embodiment as those in other embodiments may be explained with reference to the descriptions in other embodiments. Other technical effects of the embodiments of the present invention may refer to the descriptions in other embodiments, and will not be repeated here.

In an embodiment of the present invention, the PIT is integrated with the CS index, that is, to build a unified joint storage structure CMaPIT&CS by using CoMBF, which may also be called an index result. By deploying CoMBF, an efficient data structure that can directly index and share data, CMaPIT&CS can reduce the retrieval times of the forwarding plane when processing data packets and improve the retrieval performance. At the same time, the storage consumption of the forwarding plane is further reduced, the retrieval speed of name data is improved, and thus the retrieval performance is improved.

Figure 10:
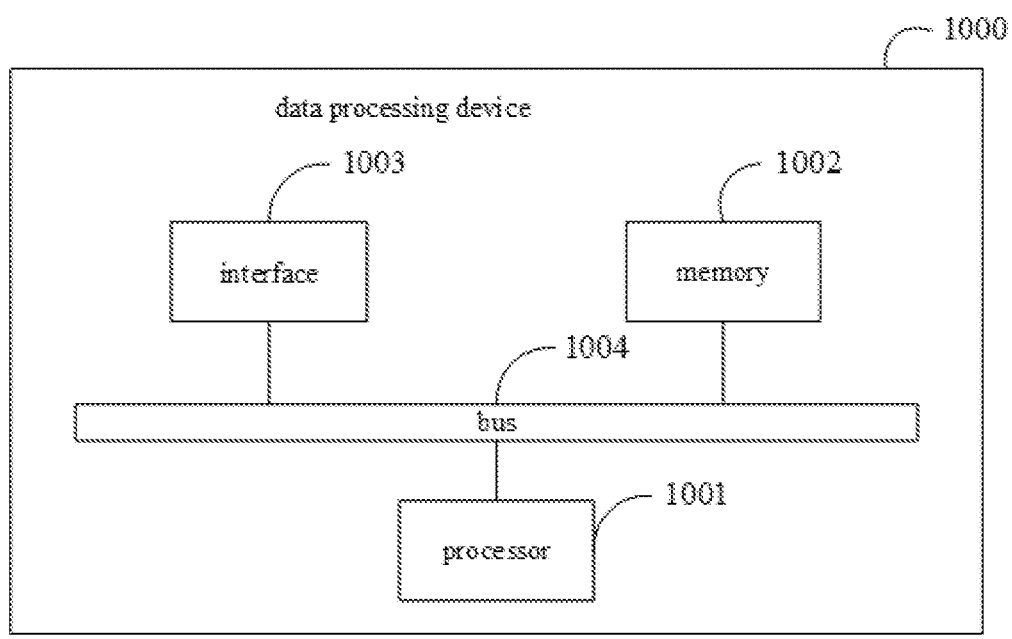
FIG. 10 is a schematic structural diagram of a data processing device according to an embodiment of the present invention.

According to some embodiments of the present invention, a data processing device 1000 is further provided. FIG. 10 is a schematic structural diagram of a data processing device according to some embodiments of the present invention. As shown in FIG. 10, the device includes a processor 1001 and a memory 1002 for storing a computer program executable on the processor.

Where, the processor 1001 is configured to, when implementing the computer program, execute the steps of any of the data processing methods shown in FIGS. 3 to 7C, and/or the steps of any of the data processing methods shown in FIGS. 8 to 9.

In an embodiment of the present invention, the data processing device 1000 may further include an interface 1003 and a bus 1004, the interface 1003 may be configured to receive or send an ICN packet or send an index unit, and the bus 1004 is configured for data interaction among the processor 1001, the memory 1002 and the interface 1003.

In an embodiment of the present invention, the data processing device may be located at a node in the ICN network, for example, it may be located at an intermediate node or a terminal node. In other embodiments of the present invention, the data processing device may be a router or a terminal.

It should be noted that the same steps or concepts in this embodiment as those in other embodiments may be explained with reference to the descriptions in other embodiments, and will not be repeated here. Other technical effects of the embodiments of the present invention may refer to the descriptions in other embodiments, and will not be repeated here.

According to some embodiments of the present invention, a computer readable storage medium is further provided, and computer readable storage medium stores a message forwarding program, which, when executed by a processor, implements the steps of the data processing method shown in the above embodiments.

It should be noted that the same steps or concepts in this embodiment as those in other embodiments may be explained with reference to the descriptions in other embodiments, and will not be repeated here. Other technical effects of the embodiments of the present invention may refer to the descriptions in other embodiments, and will not be repeated here.

In practical applications, the receiving unit, the acquiring unit, the processing unit and the sending unit in the above embodiments may all be performed by a Central Processing Unit (CPU), a Micro Processor Unit (MPU), a Digital Signal Processor (DSP), or a Field Programmable Gate Array (FPGA) located in the wireless data transmission device.

It should be understood by those skilled in the art that embodiments of the present invention may be provided as a method, a system, or a computer program product. Therefore, the present invention may take the form of a hardware embodiment, a software embodiment, or an embodiment combining software and hardware aspects. Furthermore, the present invention may take the form of a computer program product performed on one or more computer available storage media (including but not limited to magnetic disk memory and optical memory, etc.) containing computer available program code.

The present invention is described with reference to the flowcharts and/or the block diagrams of methods, devices (systems), and computer program products according to embodiments of the present invention. It should be understood that each flow and/or block in the flowcharts and/or block diagrams, and combinations of flows and/or blocks in the flowcharts and/or block diagrams may be performed by computer program instructions. These computer program instructions may be provided to a processor of a general purpose computer, a special purpose computer, an embedded processor or other programmable data processing device to produce a machine, such that the instructions which are executed by the processor of the computer or other programmable data processing device produce an apparatus for implementing the functions specified in one or more flowcharts and/or one or more block diagrams.

These computer program instructions may also be stored in a computer readable memory that can direct a computer or other programmable data processing device to operate in a specific manner, such that the instructions stored in the computer readable memory produce an article of manufacture including an instruction apparatus that implements the functions specified in one or more flows of the flowcharts and/or one or more blocks of the block diagrams.

These computer program instructions may also be loaded onto a computer or other programmable data processing device, such that a series of operational steps are performed on the computer or other programmable device to produce a computer-performed processing, such that the instructions executed on the computer or other programmable device provide steps for implementing the functions specified in one or more flows of the flowcharts and/or one or more blocks of the block diagrams.

The above description is only preferred embodiments of the present invention, and is not intended to limit the scope of protection of the present invention.

What is claimed is:

1. A data processing method, applied to a node in an Information-Centric Network (ICN), comprising:
acquiring a first offset address corresponding to a first ICN packet; and
querying a record pointed to by the first offset address and performing data processing according to the queried record;
wherein the record pointed to by the first offset address is used to store a storage address of a second ICN packet or forwarding information of the second ICN packet in response to the second ICN packet corresponding to the first ICN packet being stored locally;
wherein querying a record pointed to by the first offset address and performing data processing according to the queried record comprises:
querying whether the record pointed to by the first offset address stores the storage address of the second ICN packet in response to the first ICN packet being an Interest packet, wherein the second ICN packet is the Data packet requested by the first ICN packet; reading the second ICN packet from a storage space pointed to by the storage address of the second ICN packet in response to the record pointed to by the first offset address storing the storage address of the second ICN packet, and returning the second ICN packet according to forwarding information of the first ICN packet; and
querying whether the record pointed to by the first offset address stores the forwarding information of the second ICN packet in response to the first ICN packet being a Data packet, wherein the second ICN packet is an Interest packet requesting the first ICN packet: returning the first ICN packet according to the forwarding information of the second ICN packet in response to the record pointed to by the first offset address storing the forwarding information of the second ICN packet.

2. The method of claim 1, wherein,
in response to the first ICN packet being an Interest packet and the second ICN packet corresponding to the first ICN packet being a Data packet requested by the first ICN packet, the record pointed to by the first offset address is used to store the storage address of the second ICN packet in response to the second ICN packet being stored locally; and
in response to the first ICN packet being a Data packet and the second ICN packet corresponding to the first ICN being an Interest packet requesting the first ICN packet, the record pointed to by the first offset address is used to store the forwarding information of the second ICN packet in response to the second ICN packet being stored locally.

3. The method of claim 1, wherein: the record pointed to by the first offset address is also used to store a storage address of the first ICN packet or forwarding information of the first ICN packet after locally storing the first ICN packet;
the method further comprises: writing the forwarding information of the first ICN packet or the storage address of the first ICN packet into the record pointed to by the first offset address.

4. The method of claim 3, wherein the method further comprises:
acquiring a third offset address corresponding to a third ICN packet; and
querying a record pointed to by the third offset address and performing data processing according to the queried record;
wherein in response to the third offset address being the same as the first offset address, querying a record pointed to by the third offset address and performing data processing according to the queried record comprises:
querying the forwarding information of the first ICN packet stored in the record pointed to by the third offset address in response to the first ICN packet being the Interest packet and the third ICN packet being a Data packet requested by the first ICN packet, and returning the third ICN packet according to the queried forwarding information of the first ICN packet; and
querying the storage address of the first ICN packet stored in the record pointed to by the third offset address in response to the first ICN packet being the Data packet and the third ICN packet being an Interest packet requesting the first ICN packet, reading the first ICN packet from a storage space pointed to by the queried storage address of the first ICN packet, and returning the read first ICN packet according to the forwarding information of the third ICN packet.

5. The method of claim 1, wherein a second offset address corresponding to the second ICN packet is the same as the first offset address, and the record pointed to by the first offset address is also used to store a storage address of the first ICN packet or the forwarding information of the first ICN packet after the first ICN packet is stored locally;
querying a record pointed to by the first offset address and performing data processing according to the queried record further comprises:
updating the forwarding information of the first ICN packet stored in the record pointed to by the first offset address in response to the first ICN packet being the Interest packet and the record pointed to by the first offset address not storing the storage address of the second ICN packet; and
caching the first ICN packet and writing the storage address of the first ICN packet into the record pointed to by the first offset address, in response to the first ICN packet being the Data packet and the record pointed to by the first offset address storing the forwarding information of the second ICN packet.

6. The method of claim 1, wherein acquiring a first offset address corresponding to a first ICN packet comprises:
acquiring an identification of the second ICN packet requested by the first ICN packet in response to the first ICN packet being an Interest packet, and acquiring the first offset address according to the identification of the second ICN packet requested by the first ICN packet; and
acquiring an identification of the first ICN packet in response to the first ICN packet being a Data packet, and acquiring the first offset address according to the identification of the first ICN packet.

7. The method of claim 6, wherein before acquiring a first offset address corresponding to a first ICN packet, the method comprises:
acquiring the first ICN packet;
judging whether there is an index entry matched with the identification of the first ICN packet, wherein the index entry is used to record whether the first ICN packet and/or the second ICN packet corresponding to the first ICN packet are stored locally; and executing the step of acquiring the first offset address corresponding to the first ICN packet in response to there being the index entry matched with the identification of the first ICN packet.

8. The method of claim 7, wherein in response to the first ICN packet being the Data packet and the second ICN packet being the Interest packet, the method further comprises:

discarding the first ICN packet in response to there being no index entry matched with the identification of the first ICN packet.

9. The method of claim 7, wherein in response to the first ICN packet being the Data packet and the second ICN packet being the Interest packet, judging whether there is an index entry matched with the identification of the first ICN packet comprises:

determining a position of a flag bit corresponding to the first ICN packet in an index unit according to a positioning function, wherein a value of the flag bit in the index unit is used to indicate whether a Data packet corresponding to the flag bit is stored locally;

querying the value of the flag bit corresponding to the first ICN packet; and determining that there is the index entry matched with the identification of the first ICN packet in response to the value of the flag bit corresponding to the first ICN packet being valid.

10. The method of claim 7, wherein in response to the first ICN packet being the Interest packet and the second ICN packet being the Data packet requested by the first ICN packet, judging whether there is an index entry matched with the identification of the first ICN packet comprises:

determining a position of a flag bit corresponding to the second ICN packet corresponding to the first ICN packet in an index unit according to a positioning function;

querying a value of the flag bit corresponding to the second ICN packet; and determining that there is the index entry matched with the identification of the first ICN packet in response to the value of the flag bit corresponding to the second ICN packet being valid.

11. The method of claim 1, wherein acquiring a first offset address corresponding to a first ICN packet comprises:

determining a position of a flag bit corresponding to the first ICN packet in an index unit according to a positioning function; and determining the first offset address according to the position of the flag bit corresponding to the first ICN packet;

wherein a value of the flag bit in the index unit is used to indicate whether an Interest packet and/or a Data packet corresponding to the flag bit is stored locally.

12. A data processing method, applied to a node in an Information-Centric Network (ICN), comprising:

acquiring a first ICN packet, wherein the acquired first ICN packet is an Interest packet or a Data packet;

determining a position of a flag bit corresponding to the acquired first ICN packet in an index unit according to a positioning function; and querying or setting a value of the flag bit corresponding to the acquired first ICN packet according to the position of the flag bit corresponding to the acquired first ICN packet in the index unit;

wherein the value of the flag bit in the index unit is used to indicate whether an Interest packet and/or a Data packet corresponding to the flag bit are stored locally.

13. The method of claim 12, wherein determining a position of a flag bit corresponding to the first ICN packet in an index unit according to a positioning function comprises:

determining a position of an uncompressed flag bit mapped by the first ICN packet in the index unit according to the positioning function;

performing compressed sensing for the position of the uncompressed flag bit corresponding to the first ICN packet to obtain a position of a compressed flag bit corresponding to the first ICN packet; and taking the position of the compressed flag bit corresponding to the first ICN packet as the position of the flag bit corresponding to the first ICN;

wherein a total number of uncompressed flag bits in the index unit is greater than a total number of compressed flag bits in the index unit.

14. The method of claim 12, in the case of setting a value of the flag bit corresponding to the first ICN packet according to the position of the flag bit corresponding to the first ICN packet, wherein setting the value of the flag bit corresponding to the first ICN packet comprises:

setting the value of the flag bit corresponding to the first ICN packet to be valid in response to the first ICN packet being stored locally;

after setting the value of the flag bit corresponding to the first ICN packet to be valid, the method further comprises: sending the index unit to other nodes.

15. The method of claim 12, wherein determining a position of a flag bit corresponding to the first ICN packet in an index unit according to a positioning function comprises:

determining the position of the flag bit corresponding to the first ICN packet according to an identification of a first Data packet and the positioning function in response to the first ICN packet being the first Data packet; and determining the position of the flag bit corresponding to the first ICN packet according to an identification of a second Data packet and the positioning function in response to the first ICN packet being a second Interest packet and the Data packet requested by the second Interest packet being the second Data packet.

16. The method of claim 12, wherein after querying or setting a value of the flag bit corresponding to the first ICN packet according to the position of the flag bit corresponding to the first ICN packet, the method further comprises:

determining a first offset address corresponding to the first ICN packet according to the position of the flag bit corresponding to the first ICN packet, wherein a record pointed to by the first offset address is used to store forwarding information or a storage address of a second ICN packet corresponding to the first ICN packet; and querying the record pointed to by the first offset address corresponding to the first ICN packet and performing data processing according to the queried record.

17. The method of claim 16, wherein before determining a first offset address corresponding to the first ICN packet according to the position of the flag bit corresponding to the first ICN packet, the method further comprises:

determining whether a flag bit of the second ICN packet corresponding to the first ICN packet is valid; and executing the step of determining the first offset address corresponding to the first ICN packet according to the position of the flag bit corresponding to the first ICN packet in response to the flag bit of the second ICN packet corresponding to the first ICN packet being valid.

18. The method of claim 16, wherein after determining a position of a flag bit corresponding to the first ICN packet in an index unit according to a positioning function, the method further comprises:
acquiring a third ICN packet;
determining a position of a flag bit corresponding to the third ICN packet in the index unit according to the positioning function; and
querying a value of the flag bit corresponding to the third ICN packet.

19. The method of claim 18, wherein after determining a position of a flag bit corresponding to the third ICN packet in the index unit according to the positioning function, the method further comprises:
determining a second offset address corresponding to the third ICN packet according to the position of the flag bit corresponding to the third ICN packet, wherein a record pointed to by the second offset address is used to store forwarding information or a storage address of a fourth ICN packet corresponding to the third ICN packet; and
querying the record pointed to by the second offset address corresponding to the third ICN packet and performing data processing according to the query result.

20. The method of claim 12, wherein the positioning function comprises K hash functions, and the index unit comprises M flag bits, wherein M and K are integers greater than or equal to 1, and M is greater than or equal to K;
for any ICN packet, determining the value of the flag bit corresponding to the ICN packet in the index unit according to the positioning function comprises:
determining the values of K flag bits corresponding to the ICN packet in M flag bits of the index unit according to the ICN packet and the positioning function.

21. The method of claim 20, wherein after determining the value of the flag bit corresponding to the first ICN packet in the index unit according to the positioning function, the method further comprises:
determining a K-bit offset address corresponding to the first ICN packet according to the positions and values of K flag bits.

22. A data processing device, applied to an Information-Centric Network (ICN), wherein the device comprises a processor and a memory for storing a computer program executable in the processor;
wherein the processor is configured to, in response to performing the computer program, executes the steps of a data processing method, applied to a node in an Information-Centric Network (ICN), the method comprising:
acquiring a first offset address corresponding to a first ICN packet; and
querying a record pointed to by the first offset address and performing data processing according the queried record;
wherein the record pointed to by the first offset address is used to store a storage address of a second ICN packet or forwarding information of the second ICN packet in response to the second ICN packet corresponding to the first ICN packet being stored locally;
wherein querying a record pointed to by the first offset address and performing data processing according to the queried record comprises:
querying whether the record pointed to by the first offset address stores the storage address of the second ICN packet in response to the first ICN packet being an Interest packet, wherein the second ICN packet is the Data packet requested by the first ICN packet; reading the second ICN packet from a storage space pointed to by the storage address of the second ICN packet in response to the record pointed to by the first offset address storing the storage address of the second ICN packet, and returning the second ICN packet according to forwarding information of the first ICN packet, and
querying whether the record pointed by the first offset address stores the forwarding information of the second ICN packet in response to the first ICN packet being a Data packet, wherein the second ICN packet is an Interest packet requesting the first ICN packet: returning the first ICN packet according to the forwarding information of the second ICN packet in response to the record pointed to by the first offset address storing the forwarding information of the second ICN packet, and/or
executes the steps of a data processing method, applied to a node in an Information-Centric Network (ICN), the method comprising:
acquiring a first ICN packet, wherein the acquired first ICN packet is an Interest packet or a Data packet;
determining a position of a flag bit corresponding to the acquired first ICN packet in an index unit according to a positioning function; and
querying or setting a value of the flag bit corresponding to the acquired first ICN packet according to the position of the flag bit corresponding to the acquired first ICN packet in the index unit;
wherein the value of the flag bit in the index unit is used to indicate whether an Interest packet and/or a Data packet corresponding to the flag bit are stored locally.

* * * * *